(12) United States Patent
Mokheimer et al.

(10) Patent No.: US 11,852,382 B2
(45) Date of Patent: Dec. 26, 2023

(54) HEATING AND COOLING SYSTEM POWERED BY RENEWABLE ENERGY AND ASSISTED BY GEOTHERMAL ENERGY

(71) Applicants: KING FAHD UNIVERSITY OF PETROLEUM AND MINERALS, Dhahran (SA); KING ABDULLAH CITY FOR ATOMIC & RENEWABLE ENERGY (K.A.CARE), Riyadh (SA)

(72) Inventors: Esmail M. A. Mokheimer, Dhahran (SA); Mohamed A. Habib, Dhahran (SA); Mohammad Raghib Shakeel, Dhahran (SA)

(73) Assignees: KING FAHD UNIVERSITY OF PETROLEUM AND MINERALS, Dhahran (SA); KING ABDULLAH CITY FOR ATOMIC & RENEWABLE ENERGY (K.A.CARE), Riyadh (SA)

( * ) Notice: Subject to any disclaimer, the term of this patent is extended or adjusted under 35 U.S.C. 154(b) by 138 days.

(21) Appl. No.: 17/531,293

(22) Filed: Nov. 19, 2021

(65) Prior Publication Data
US 2023/0160606 A1 May 25, 2023

(51) Int. Cl.
*F24S 20/40* (2018.01)
*F24S 60/30* (2018.01)
(Continued)

(52) U.S. Cl.
CPC .............. *F24S 20/40* (2018.05); *F03G 4/001* (2021.08); *F03G 4/029* (2021.08); *F03G 4/037* (2021.08);
(Continued)

(58) Field of Classification Search
CPC .... F02C 1/05; F02C 1/10; F02C 1/105; F25B 25/005; F25B 27/00; F25B 2313/002;
(Continued)

(56) References Cited

U.S. PATENT DOCUMENTS 2,952,138 A * 9/1960 Russell ................... F25B 27/00
165/61
3,390,526 A * 7/1968 Bienko .................. F01K 15/00
60/711
(Continued)

FOREIGN PATENT DOCUMENTS

CN 107630726 A 1/2018
CN 207348915 U 5/2018
(Continued)

OTHER PUBLICATIONS

Ismail ; ORC-Based Geothermal Power Generation and CO2-Based EGS for Combined Green Power Generation and CO2 Sequestration ; New Developments in Renewable Energy ; Chapter 13 ; 2013.
(Continued)

*Primary Examiner* — Kenneth J Hansen
*Assistant Examiner* — Wesley G Harris
(74) *Attorney, Agent, or Firm* — Oblon, McClelland, Maier & Neustadt, L.L.P.

(57) ABSTRACT

A heating and cooling system powered by renewable energy and assisted with geothermal energy includes a solar cycling unit, a supercritical carbon dioxide (S—$CO_2$) unit, and a refrigerant cycling unit. Solar energy obtained at the solar cycling unit may be used to power the S—$CO_2$ cycling unit. To do so, the solar cycling unit utilizes a solar collector, a thermal energy storage, and a heat exchanger along with a first working fluid which is preferably molten salt or Therminol. Next, the energy generated at the S—$CO_2$ cycling unit, which preferably circulates S—$CO_2$ as a second work- (Continued)

ing fluid, may be used to operate the refrigerant cycling unit. In the refrigerant cycling unit, Tetrafluroethene is preferably used as the third working fluid to produce required cooling effects. Additionally, geothermal heat exchangers may be integrated into the system for use during varying weather conditions.

13 Claims, 15 Drawing Sheets

(51) Int. Cl.
  *F24S 20/20* (2018.01)
  *F03G 4/00* (2006.01)
  *F03G 6/06* (2006.01)
  *F03G 6/00* (2006.01)
  *F28D 20/00* (2006.01)
(52) U.S. Cl.
  CPC ............. *F03G 4/063* (2021.08); *F03G 6/067* (2013.01); *F03G 6/068* (2013.01); *F03G 6/071* (2021.08); *F24S 20/20* (2018.05); *F24S 60/30* (2018.05); *F28D 2020/0047* (2013.01)
(58) Field of Classification Search
  CPC ........ F25B 27/002; F25B 27/005; F25B 9/06; F25B 11/02; B64D 2013/0648; F24S 20/40; F24S 20/20; F24S 60/30; F28D 2020/0047; F03G 4/001; F03G 4/029; F03G 4/037; F03G 4/063; F03G 6/067; F03G 6/068; F03G 6/071
  See application file for complete search history.

(56) References Cited

U.S. PATENT DOCUMENTS

| | | | | | |
|---|---|---|---|---|---|
| 3,409,782 | A | * | 11/1968 | Bronicki | H02K 7/1823 |
| | | | | | 290/40 R |
| 3,519,066 | A | * | 7/1970 | Anderson | F25B 29/003 |
| 4,360,056 | A | * | 11/1982 | O'Connell | F24T 10/40 |
| | | | | | 165/45 |
| 5,381,675 | A | * | 1/1995 | Siegel | F04B 45/022 |
| | | | | | 62/268 |
| 9,297,367 | B2 | * | 3/2016 | Ramaswamy | F03G 6/003 |
| 9,528,731 | B2 | * | 12/2016 | Khaliq | F25B 27/008 |
| 2008/0127647 | A1 | * | 6/2008 | Leitner | F24S 20/20 |
| | | | | | 126/634 |
| 2012/0124998 | A1 | * | 5/2012 | Newman | F24S 20/40 |
| | | | | | 60/641.1 |
| 2012/0125019 | A1 | * | 5/2012 | Sami | F25B 30/06 |
| | | | | | 62/235.1 |
| 2013/0299123 | A1 | * | 11/2013 | Matula | F25D 17/00 |
| | | | | | 165/45 |
| 2016/0017758 | A1 | | 1/2016 | Vermeersch et al. | |
| 2016/0108763 | A1 | * | 4/2016 | AlZahrani | F01K 9/003 |
| | | | | | 60/671 |

FOREIGN PATENT DOCUMENTS

| | | | | |
|---|---|---|---|---|
| CN | 106286170 B | | 10/2018 | |
| DE | 19632019 | * | 8/1996 | ............ F01K 25/10 |
| EP | 1 930 587 A2 | | 12/2007 | |
| JP | 5299656 B1 | | 9/2013 | |

OTHER PUBLICATIONS

Li ; Design of Supercritical CO2 Jointing Solar Thermal Refrigeration System with Utilization of Ship Waste Heat ; Advances in Engineering Research (AER), vol. 111 ; 2017.

Ma, et al. ; Advanced Supercritical Carbon Dioxide Power Cycle Configurations for Use in Concentrating Solar Power Systems; Conference Paper; Supercritical CO2 Power Cycle Symposium ; May 24-24, 2011.

* cited by examiner

HEATING AND COOLING SYSTEM POWERED BY RENEWABLE ENERGY AND ASSISTED BY GEOTHERMAL ENERGY

BACKGROUND

Field of the Invention

The present disclosure relates to a cooling and heating system that utilizes renewable energy in conjunction with geothermal energy. Preferably, solar energy is used in the heating and cooling processes described in the system of the present disclosure.

Description of the Related Art

Steam Rankine cycle-based power generation systems and Gas Brayton cycle-based power generation systems are two widely used power generation systems. Rankine cycle-based steam power generation systems operate under low turbine inlet temperatures and the working fluid, which is water, is compressed in liquid state. Gas turbines have the ability to operate at high temperatures. However, air used in gas turbines requires a substantial amount of compressing, and thus the net power produced from the gas turbines is lowered. In terms of thermal efficiency, both the steam Rankine cycle-based power generation systems and gas-Brayton cycle-based systems have similar thermal efficiencies, wherein the thermal efficiency is heavily dependent on the working fluid. Therefore, having a working fluid that can operate at high turbine inlet temperatures while still being able to be compressed effectively is beneficial for a power generation system. Super-critical carbon dioxide (S—$CO_2$) cycles have been researched and developed since S—$CO_2$ combines the advantages of a steam Rankine cycle-based power generation system and a gas Brayton cycle-based power generation system. When used in power generation systems, $CO_2$ is compressed in an incompressible region and later expanded at higher temperatures, wherein $CO_2$ has a critical point at a critical temperature is within a range of 25-Celsius (° C.)-35° C. and a critical pressure is within a range of 6 Mega pascal (1 MPa)-9 MPa.

FIG. 1 is an illustration of a layout for a S—$CO_2$ cycle, wherein the layout is similar to a steam Rankine cycle but the components used are similar to that of gas turbines. The heat added to the $CO_2$ after stage 10 can be from burning fuel or from solar. See Zhang X R, Yamaguchi H, Fujima K, Enomoto M, Sawada N. Study of solar energy powered transcritical cycle using supercritical carbon dioxide. Int J Energy Res 2006; 30:1117-29. doi:10.1002/er.1201, incorporated herein by reference in its entirety. Extensive literature reviews have been conducted on the use of S—$CO_2$ cycles for power generation. See Cha J E, Baik S, Lee J I, Ahn Y, Kim M, Cho S K, et al. Review of supercritical $CO_2$ power cycle technology and current status of research and development. Nucl Eng Technol 2015; 47:647-61. doi: 10.1016/j.net.2015.06.009; and Crespi F, Gavagnin G, Sanchez D, Martinez G S. Supercritical carbon dioxide cycles for power generation: A review. Appl Energy 2017; 195: 152-83. doi:10.1016/j.apenergy.2017.02.048, each incorporated herein by reference in their entirety.

Refrigeration and/or cooling of buildings consume a significant amount of power. In Middle Eastern countries like Saudi Arabia, about 50% of the produced electrical energy is used for buildings, and approximately 70% alone is utilized to meet the air conditioning load. See Mokheimer E M A, Shakeel M R, Al-Sadah J. A novel design of solar chimney for cooling load reduction and other applications in buildings. Energy Build 2017; 153. doi:10.1016/j.enbuild.2017.08.011, incorporated herein by reference in its entirety. In general, two cycles are performed for the cooling effect. Namely, the vapor compression system and the vapor absorption system. The vapor compression system has the advantage of being compact and small enough to be used in housing units that require cooling. On the other hand, vapor absorption systems are large, and are often used to cool large buildings. The energy required by vapor absorption systems can be obtained using solar heaters. Solar-assisted, cascaded vapor compression/absorption systems for air conditioning have been studied, and FIG. 2 is a schematic diagram of one such cycle. See Chinnappa J C V, Crees M R, Srinivasa Murthy S, Srinivasan K. Solar-assisted vapor compression/absorption cascaded air-conditioning systems. Sol Energy 1993; 50:453-8. doi:10.1016/0038-092X(93)90068-Y, incorporated herein by reference in its entirety.

Many extensive reviews cover the development of solar assisted vapor compression systems and solar assisted absorption systems. See Al-Alili A, Hwang Y, Radermacher R. Review of solar thermal air conditioning technologies. Int J Refrig 2014; 39:4-22. doi:10.1016/j.ijrefrig.2013.11.028; Gugulothu R, Somanchi N S, Banoth H B, Banothu K. A Review on Solar Powered Air Conditioning System. Procedia Earth Planet Sci 2015; 11:361-7. doi:10.1016/j.proeps.2015.06.073; Zeyghami M, Goswami D Y, Stefanakos E. A review of solar thermo-mechanical refrigeration and cooling methods. Renew Sustain Energy Rev 2015; 51:1428-45. doi:10.1016/j.rser.2015.07.011; Sarbu I, Sebarchievici C. Review of solar refrigeration and cooling systems. Energy Build 2013; 67:286-97. doi:10.1016/j.enbuild.2013.08.022; Zeraouli Y, Bruel P, Jamil A, Kousksou T, Allouhi A, Mourad Y. Solar driven cooling systems: An updated review. Renew Sustain Energy Rev 2015; 44:159-81. doi:10.1016/j.rser.2014.12.014; Alobaid M, Hughes B, Calautit J K, O'Connor D, Heyes A. A review of solar driven absorption cooling with photovoltaic thermal systems. Renew Sustain Energy Rev 2017; 76:728-42. doi:10.1016/j.rser.2017.03.081; Zeyghami M, Goswami D Y, Stefanakos E. A review of solar thermo-mechanical refrigeration and cooling methods. Renew Sustain Energy Rev 2015; 51:1428-45. doi:10.1016/j.rser.2015.07.011; Siddiqui M U, Said S A M. A review of solar powered absorption systems. Renew Sustain Energy Rev 2015; 42:93-115. doi:10.1016/j.rser.2014.10.014; Ibrahim N I, Al-Sulaiman F A, Ani F N. Solar absorption systems with integrated absorption energy storage—A review. Renew Sustain Energy Rev 2018; 82:1602-10. doi:10.1016/j.rser.2017.07.005; Leonzio G. Solar systems integrated with absorption heat pumps and thermal energy storages: state of art. Renew Sustain Energy Rev 2017; 70:492-505. doi:10.1016/j.rser.2016.11.117; Dieng a. Literature review on solar adsorption technologies for ice-making and air-conditioning purposes and recent developments in solar technology. Renew Sustain Energy Rev 2001; 5:313-42. doi:10.1016/S1364-0321(01)00004-1; and Iqbal A A, Al-Alili A. Review of Solar Cooling Technologies in the MENA Region. J Sol Energy Eng 2018; 141:010801. doi:10.1115/1.4041159, each incorporated herein by reference in their entirety. Other studies have also been conducted where $CO_2$ is used as the working fluid in refrigeration cycles. See A X-J L, Zhang X-R. Preliminary investigation of a transcritical $CO_2$ heat pump driven by a solar-powered $CO_2$ Rankine cycle. Int J Energy Res 2012; 37:1361-71. doi:10.1002/er.2938; Ge Y T, Tassou S A. Thermodynamic analysis of transcritical $CO_2$ booster refrigeration systems in supermarket. Energy Conyers Manag 2011; 52:1868-75. doi:10.1016/j.enconman.2010.11.015; Yamaguchi H, Zhang X R. A novel $CO_2$ refrigeration system achieved by $CO_2$ solid-gas two-phase fluid and its basic study on system performance. Int J Refrig 2009; 32:1683-93. doi:10.1016/j.ijrefrig.2009.05.003; Farsi A, Mohammadi S M H, Ameri M. An efficient combination of trans critical $CO_2$ refrigeration and multi-effect desalination: Energy and economic analysis. Energy Conyers Manag 2016; 127:561-75. doi:10.1016/j.enconman.2016.09.038; Ierin V, Volovyk O, Liu C Te, Shestopalov K, Petrenko V O, Huang B-J. Advanced Solar-Assisted Cascade Ejector Cooling/$CO_2$ Sub-Critical Mechanical Compression Refrigeration System 2016:1-11. doi:10.18086/swc.2011.20.20; and Bao J, Lin Y, He G. Working fluids comparison and thermodynamic analysis of a transcritical power and ejector refrigeration cycle (TPERC). Int J Refrig 2017; 82:262-72. doi:10.1016/j.ijrefrig.2017.05.025, each incorporated herein by reference in their entirety.

Cryogenic refrigeration using $CO_2$ solid-gas two phase flow has been proposed and studied. See Yamaguchi et al. (2009); and Yamaguchi H, Zhang X R, Fujima K. Basic study on new cryogenic refrigeration using $CO_2$ solid-gas two phase flow. Int J Refrig 2008; 31:404-10. doi:10.1016/j.ijrefrig.2007.08.001, each incorporated herein by reference in their entirety. The proposed $CO_2$ refrigeration system of the prior art consists of two thermodynamic cycles arranged in cascade, where one cycle is a $CO_2$ trans-critical cycle, and the other is a trans-triple-point cycle. The system of the prior art was able to achieve a cooling temperature of about −56° C. The average coefficient of performance (COP) recorded was about 2.45, wherein the COP is a ratio of useful heating/cooling provided to work required. Higher COPs equate to lower operating costs. FIG. 3 is a schematic diagram of the test bench used for the study of the prior art.

Juan and Zhang proposed a cycle that utilizes a dual interconnected $CO_2$ cycle, where one of the cycles utilizes solar energy to rotate a turbine and a shaft that connects the turbine to a compressor. The other cycle performs cooling purposes using trans-critical $CO_2$ as the working fluid. FIG. 4 is an illustration of the schematic diagram of the system used in the prior art. The COP of the trans-critical $CO_2$ cooling cycle is about 0.3.

Petrenko et al. proposed and studied a solar assisted ejector cooling/$CO_2$ sub-critical mechanical compression refrigeration system. FIG. 5 shows the schematic diagram of the solar-assisted cascade ejector system working with sub-critical $CO_2$, wherein sub-critical $CO_2$ was utilized in the bottoming cycle of the system of the prior art.

Shown in FIG. 6, Chen et al. used supercritical $CO_2$ as the working fluid in a solar powered S—$CO_2$ cycle that was used to operate a Lithium Bromide-Water (LiBr—$H_2O$) based absorption system for cooling. The maximum COP of a chiller used within the system of the prior art was found to be around 1.0. See Chen L, Chen Y M, Sun M H, Zhang Y L, Zhang X R. Concept design and formation of a lithium bromide-water cooling system powered by supercritical $CO_2$ solar collector. Energy Conyers Manag 2014; 85:313-22. doi:10.1016/j.enconman.2014.05.086, incorporated herein by reference in its entirety.

Zahrani and Dincer describe a solar assisted trans-critical $CO_2$ system which is shown in FIG. 7. In addition to producing power, the system of the prior art also produced a cooling effect by the use of ammonia-water ($NH_3$—$H_2O$) based absorption cycle. See Zahrani A A R Al, Dincer I. Rankine Cycle Power Generation System with SC—$CO_2$ Working Fluid and Integrated Absorption Refrigeration Chiller. US 2016/0108763 A1, 2016. doi:10.1016/j.(73); and AlZahrani A A, Dincer I. Thermodynamic analysis of an integrated trans-critical carbon dioxide power cycle for concentrated solar power systems. Sol Energy 2018; 170: 557-67. doi:10.1016/j.solener.2018.05.071, each incorporated herein by reference in their entirety. The trans-critical $CO_2$ cycle was found to achieve exergetic and energetic efficiencies of about 80% and 35% respectively. The COP of the cooling system was 0.7.

Chen et al. proposed and examined a novel absorption-compression system capable of producing temperature as low as −60° C. See Chen Y, Han W, Jin H. Proposal and analysis of a novel heat-driven absorption-compression refrigeration system at low temperatures. Appl Energy 2017; 185:2106-16. doi:10.1016/j.apenergy.2015.12.009, incorporated herein by reference in its entirety. The system, shown in a schematic diagram in FIG. 8, uses a $NH_3$—$H_2O$ based turbine to power a $CO_2$ vapor compression system for cooling. In the system of the prior art, the compression system was cooled using a $NH_3$—$H_2O$ absorption cycle which is also connected to the turbine. The COP of the system was approximately about 0.25.

In view of the drawbacks of the existing power generation systems, the present disclosure describes a solar powered and geothermal assisted power generation system. In doing so, the system of the present disclosure includes a solar cycling unit, a supercritical carbon dioxide cycling unit, and a refrigerant cycling unit that can be configured to operate during cold weather conditions as well as hot weather conditions.

SUMMARY OF THE INVENTION

The present disclosure describes a heating and cooling system that is powered by renewable energy and assisted by geothermal energy. To perform the heating and cooling processes, the system of the present disclosure comprises a solar cycling unit, a supercritical carbon dioxide (S—$CO_2$) cycling unit, and a refrigerant cycling unit.

The solar cycling unit includes a first working fluid, a solar collector, a heat exchanger, and a first pump. Solar energy gathered by the solar collector is used to heat the first working fluid that passes through the heat exchanger. A pipeline carrying a second working fluid of the S—$CO_2$ cycling unit also passes through the heat exchanger. Thus, thermal energy from the first working fluid can be transferred onto the second working fluid. A turbine of the S—$CO_2$ cycling unit is used to power a compressor and refrigerant of the refrigerant cycling unit to produce a cooling effect.

The solar cycling unit, the S—$CO_2$ cycling unit, and the refrigerant cycling unit can be configured to operate in cold weather conditions as well as hot weather conditions. In doing so, geothermal heat exchangers can be included to be in thermal communication with the solar cycling unit, the S—$CO_2$ cycling unit, and/or the refrigerant cycling unit.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

All illustrations of the drawings are for the purpose of describing selected embodiments of the present disclosure and are not intended to limit the scope of the present disclosure or accompanying claims.

The present disclosure describes a power generation system that primarily uses solar energy and can be assisted by geothermal energy. The present disclosure describes multiple cycles, wherein each cycle may be configured to perform one or more heating and/or cooling processes in varying weather conditions.

Figure 1:
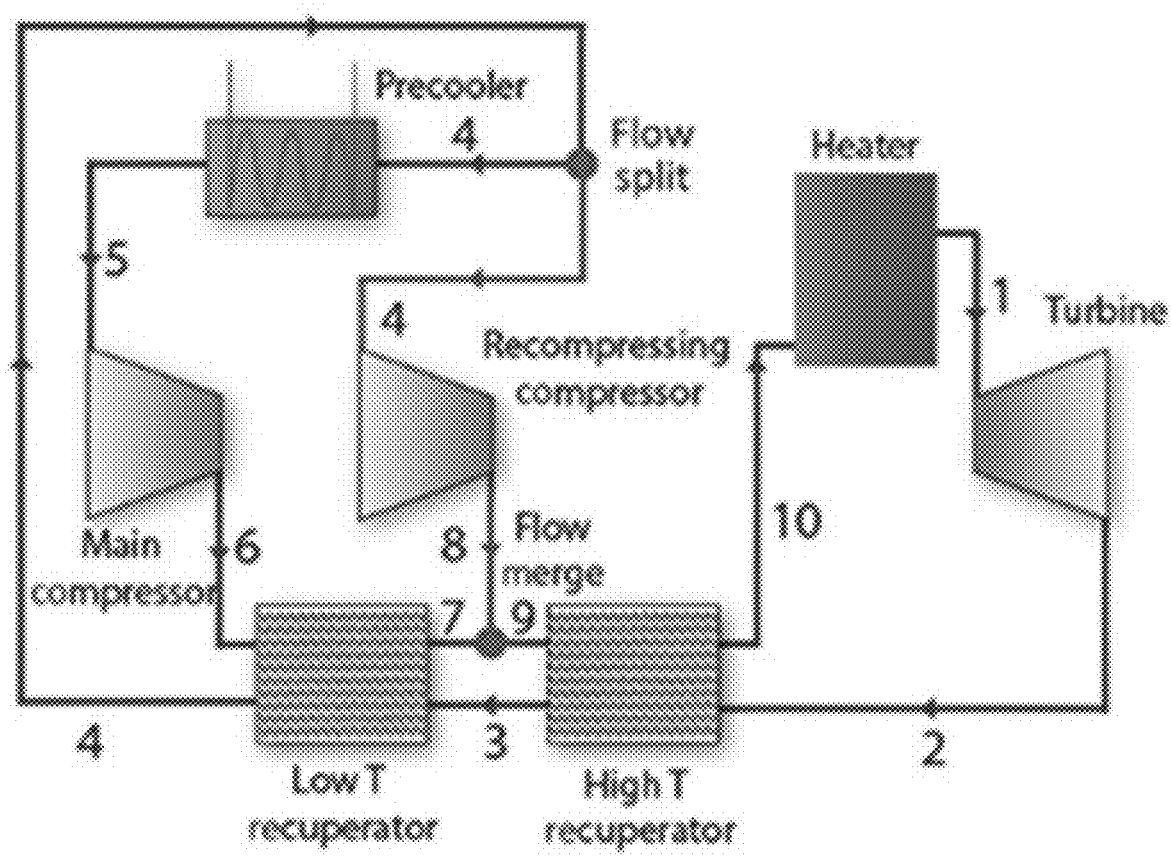
FIG. 1 is a schematic diagram of a supercritical carbon dioxide (S—$CO_2$) cycle.
Figure 2:
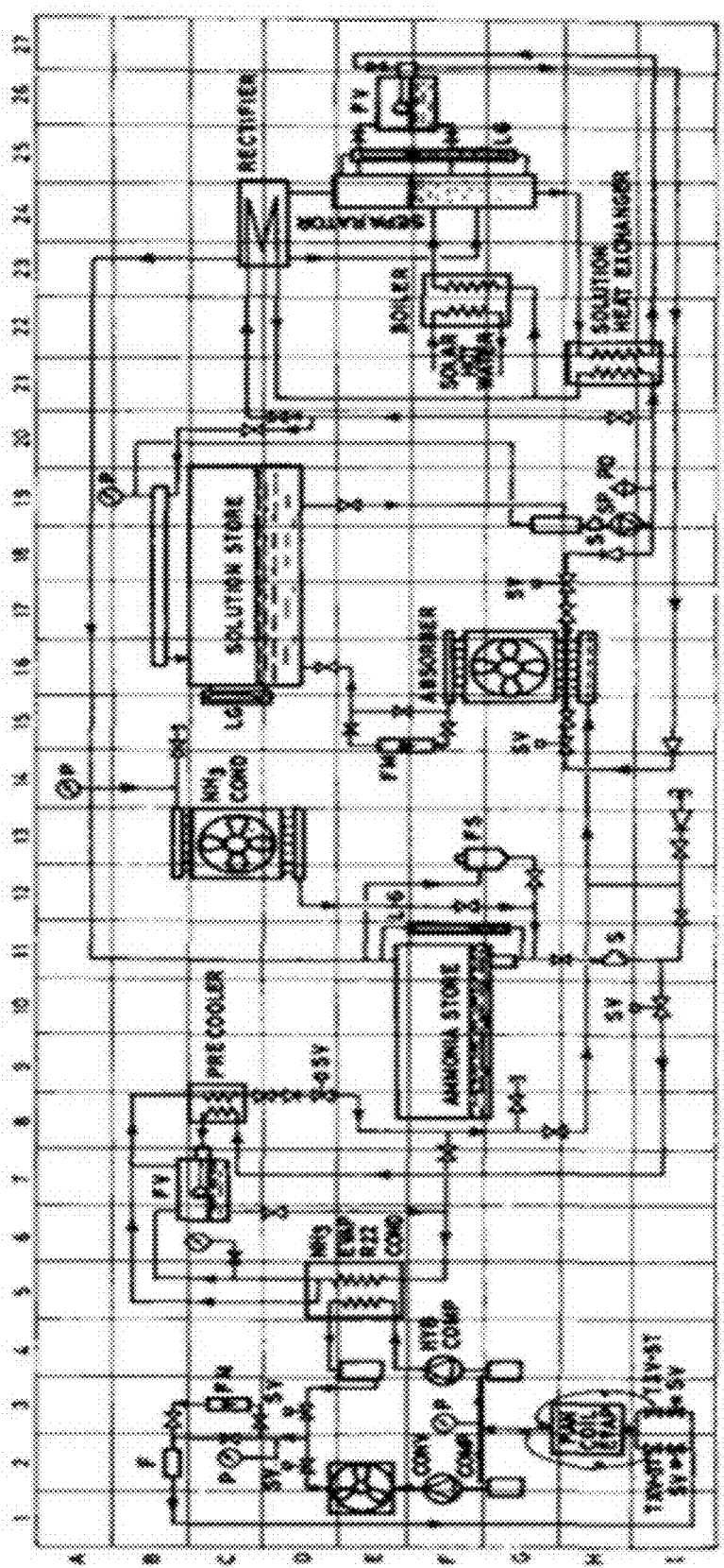
FIG. 2 is a schematic diagram of a cascaded vapor system.
Figure 3:
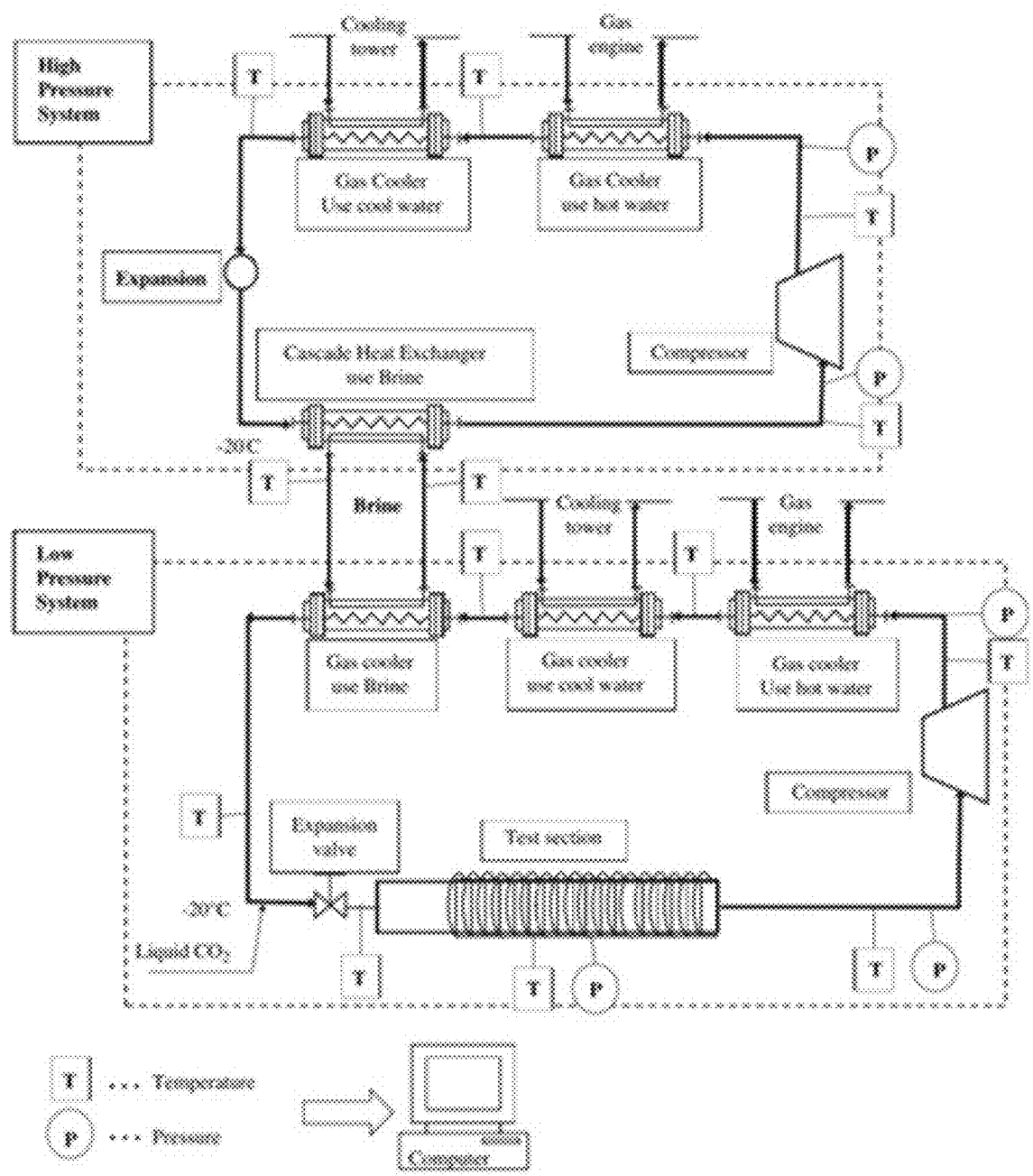
FIG. 3 is a schematic diagram of an experimental setup used in cryogenic refrigeration using $CO_2$ solid-gas two phase flow.
Figure 4:
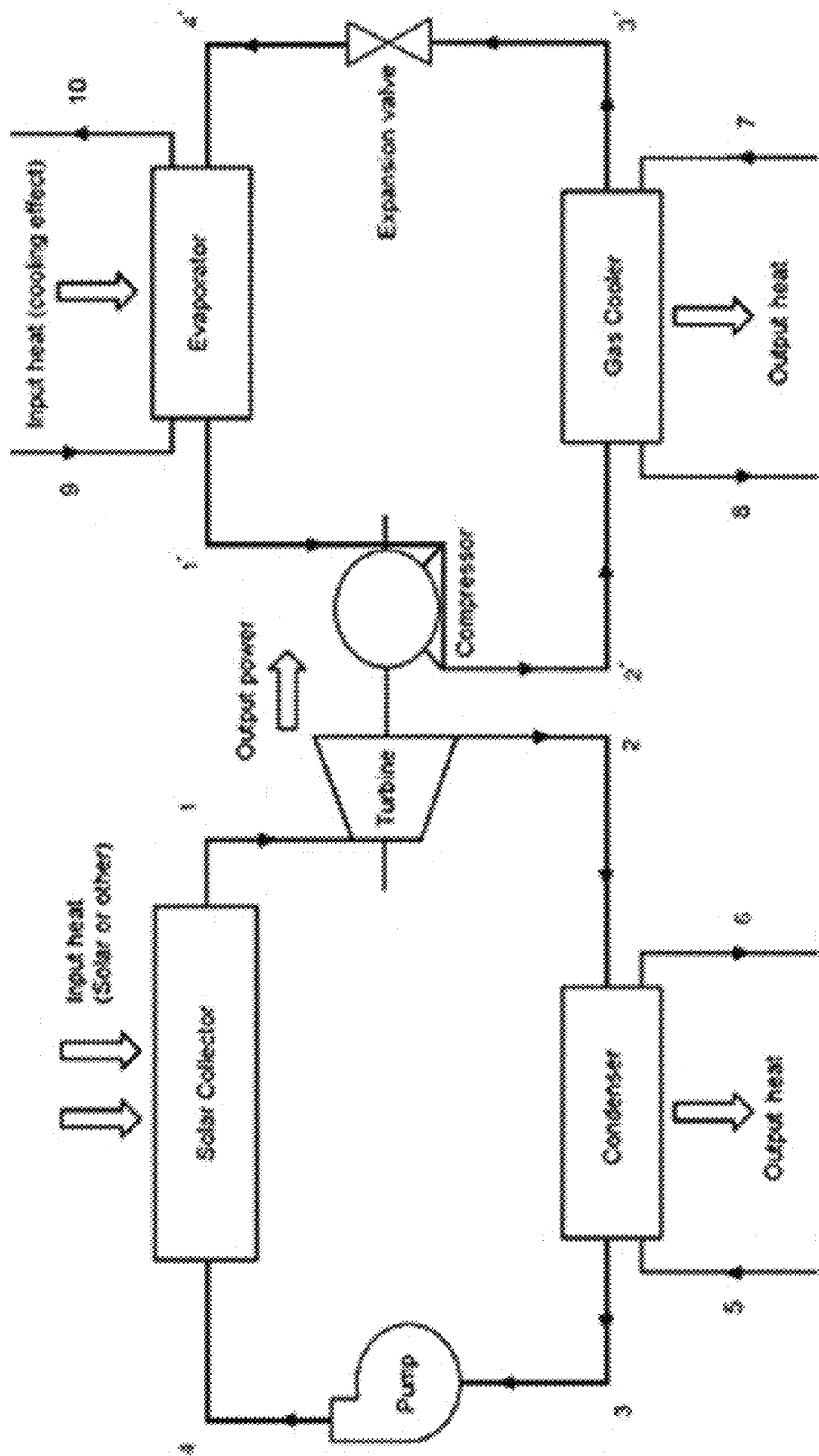
FIG. 4 is a schematic diagram used in a cycle that utilizes a dual interconnected $CO_2$ cycle.
Figure 5:
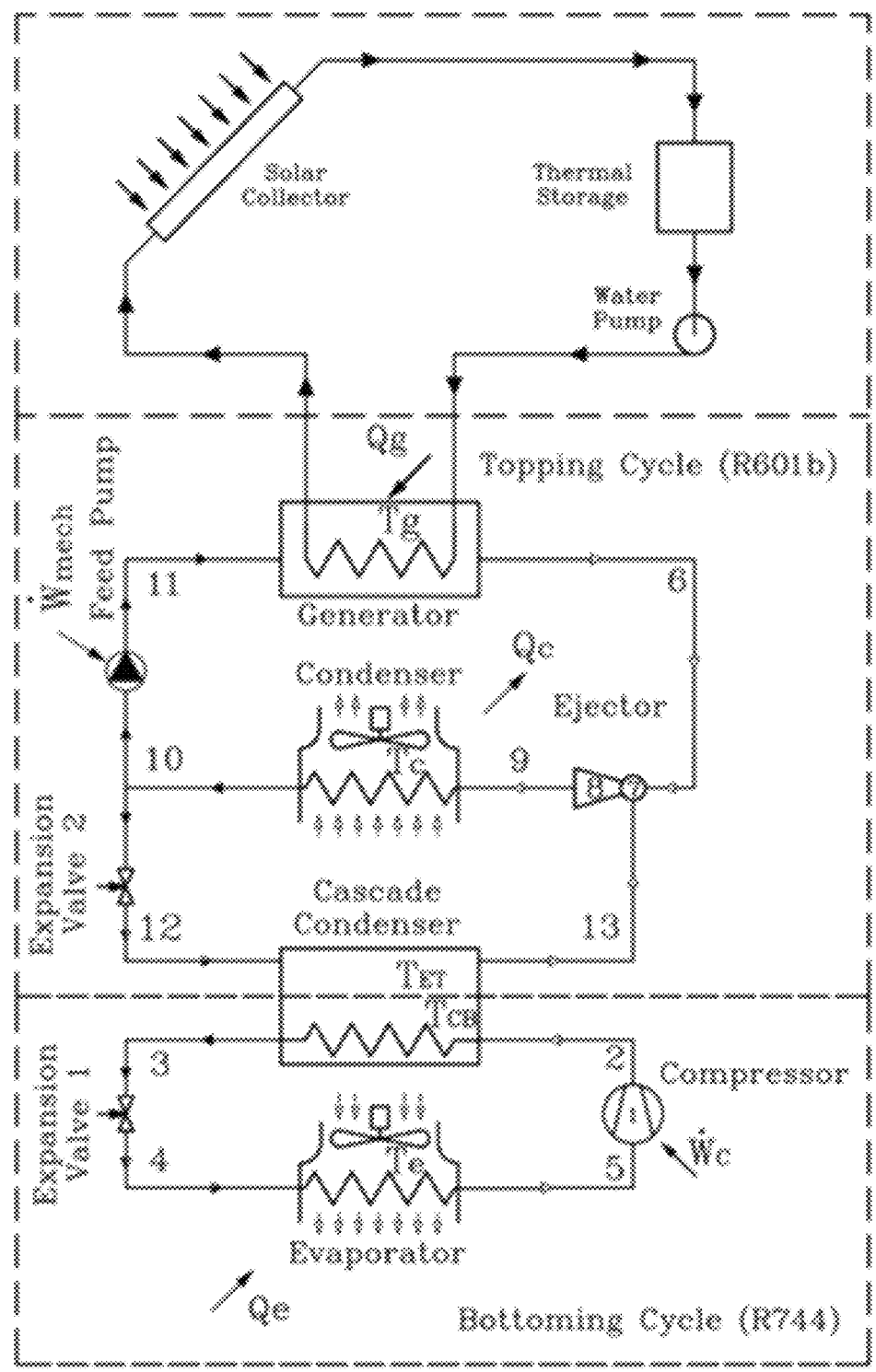
FIG. 5 is a schematic diagram of a solar assisted ejector cooling/$CO_2$ sub-critical mechanical compression refrigeration system.
Figure 6:
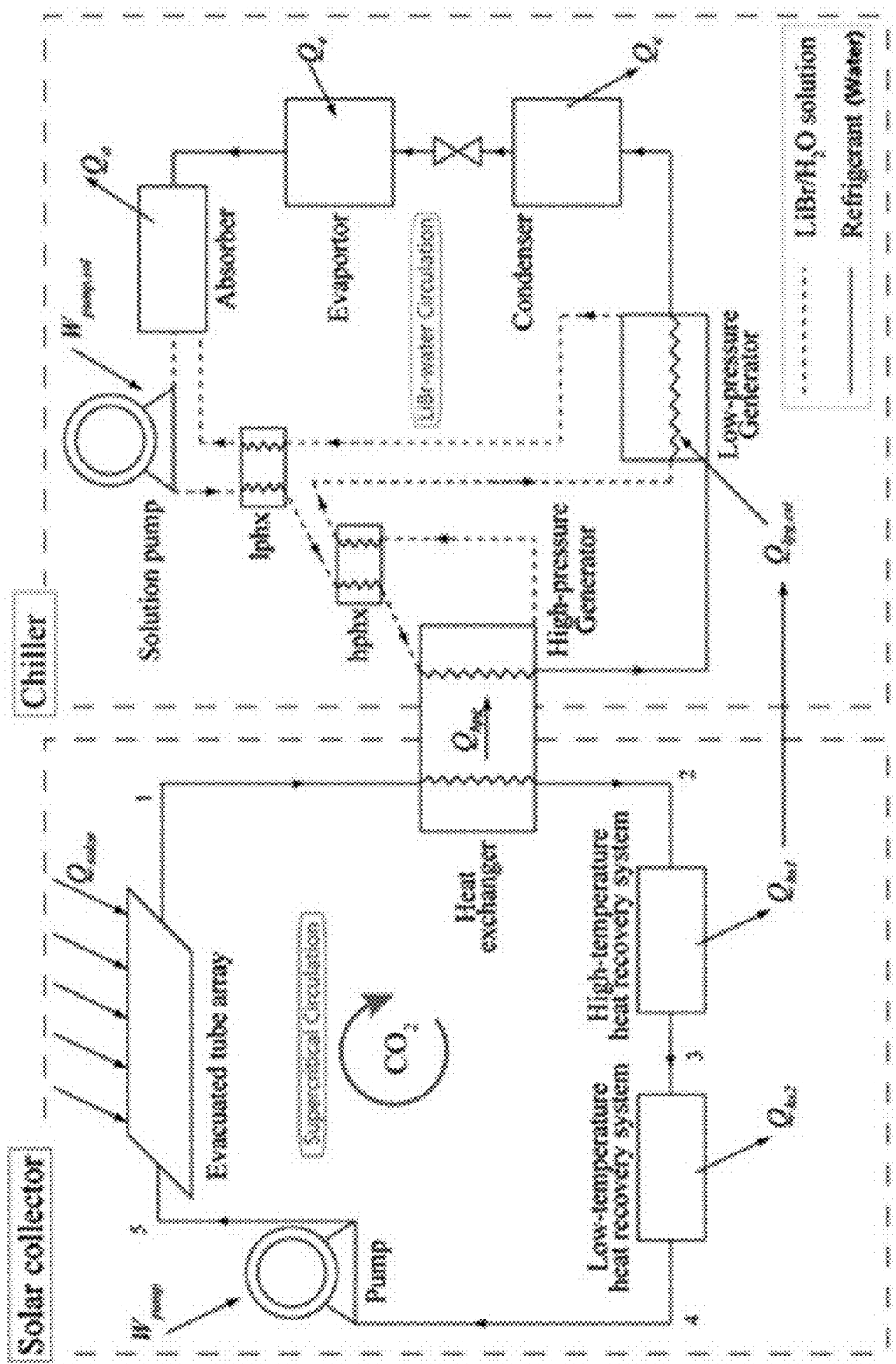
FIG. 6 is a schematic diagram of a S—$CO_2$ based lithium bromide water solar cooling system.
Figure 7:
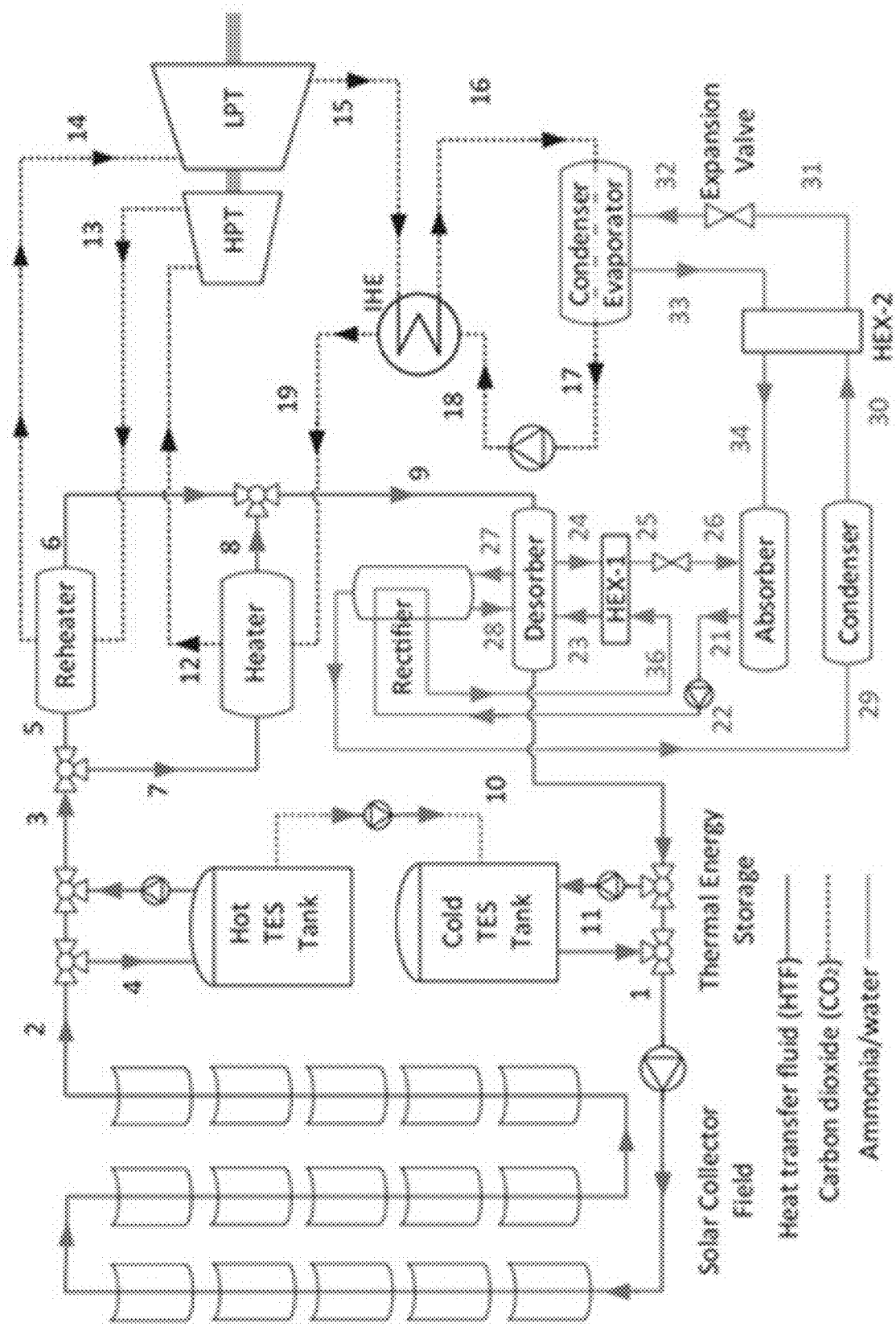
FIG. 7 is a schematic diagram of a solar assisted trans-critical $CO_2$ system which in addition to producing power also produces a cooling effect by using an ammonia-water ($NH_3$—$H_2O$) based absorption cycle.
Figure 8:
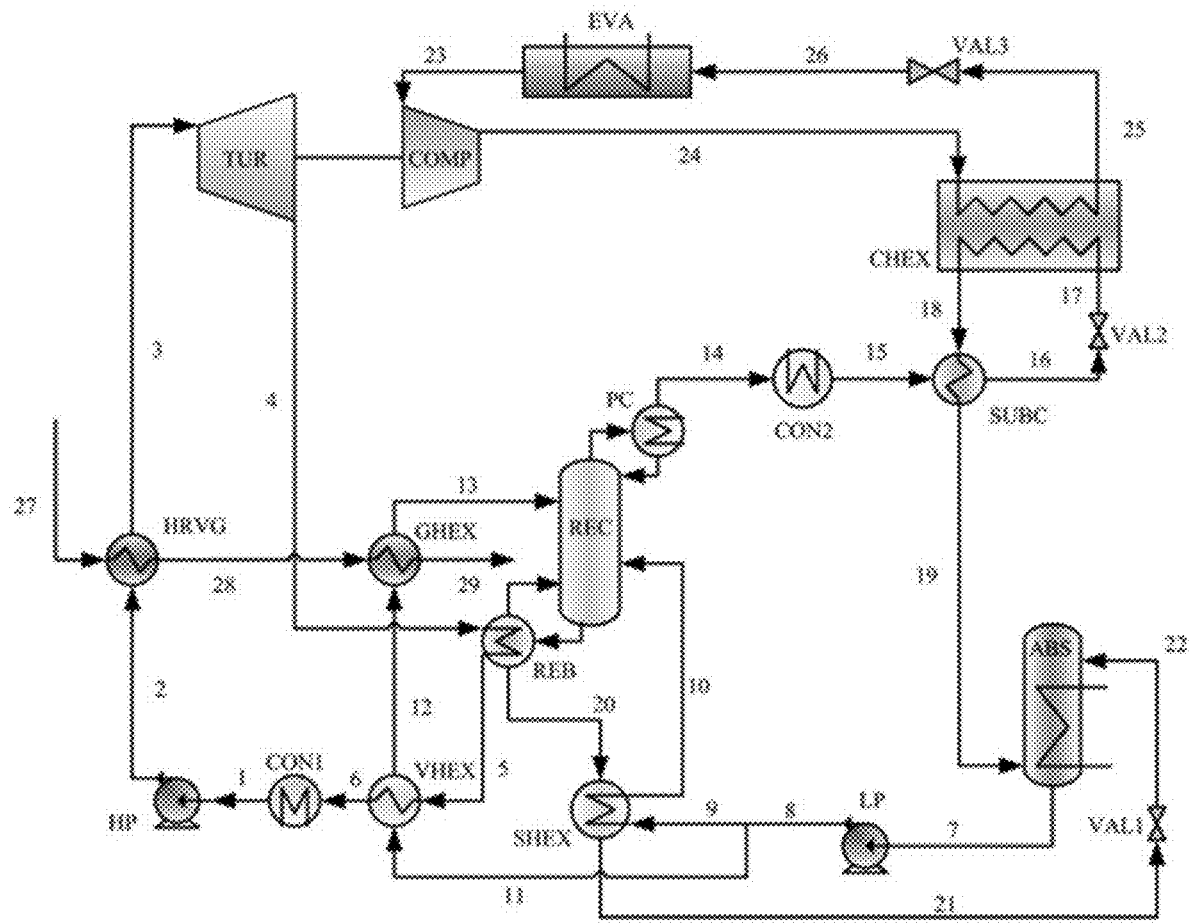
FIG. 8 is a schematic diagram of an absorption-compression refrigeration system capable of producing temperatures as low as −60° C.
Figure 9:
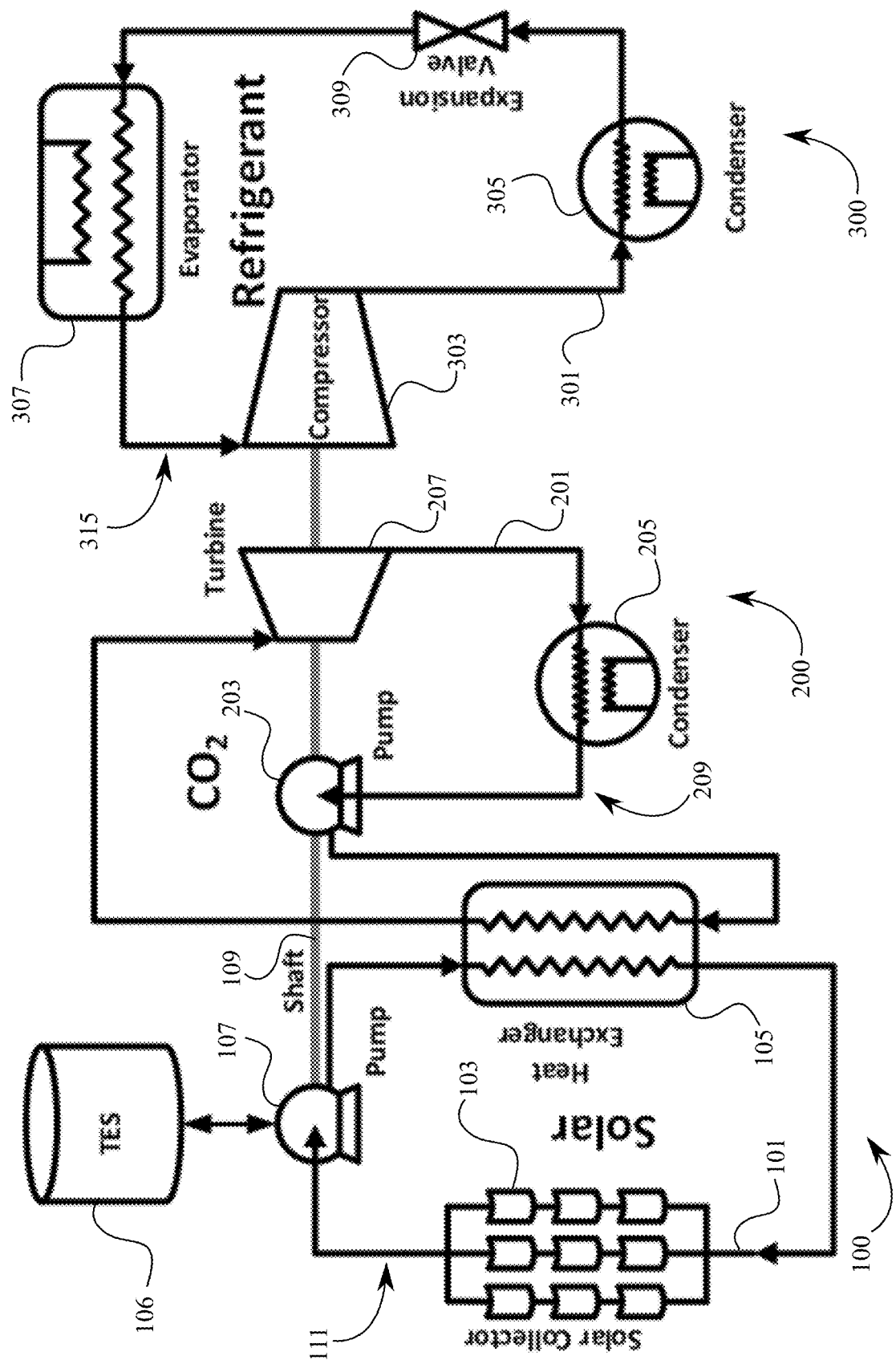
FIG. 9 is a schematic diagram of a proposed cycle of the system of the present disclosure.

As seen in FIG. 9, in a preferred cycle, the system of the present disclosure comprises a solar cycling unit 100, a supercritical carbon dioxide (S—$CO_2$) cycling unit 200, and a refrigerant cycling unit 300. The solar cycling unit 100 comprises a solar collector 103, a heat exchanger 105, and a first pump 107 which are in fluid communication with each other through a first piping system 111 carrying a first working fluid 101. The solar cycling unit 100 may provide sufficient power to operate the S—$CO_2$ cycling unit 200. The S—$CO_2$ cycling unit 200, which produces power through a turbine 207, runs a compressor 303 of the refrigerant cycling unit 300 that provides cooling and heating effects. The pump 107 and 203 are preferably in common mechanical communication, e.g., a shaft or geared mechanism, with the compressor 303. The use of the S—$CO_2$ cycling unit 200 allows the refrigerant cycling unit 300 to utilize a turbine 207 that is comparatively smaller in size such that the system of the present disclosure may be integrated to common chiller package systems that is utilized to cool large buildings.

The solar collector 103 collects heat by absorbing sunlight. The solar collector may be concentrating or non-concentrating. In non-concentrating collectors, the aperture area (i.e., the area that receives the solar radiation) is roughly the same as the absorber area (i.e., the area absorbing the radiation). Concentrating collectors have a much bigger aperture than the absorber area (additional mirrors focus sunlight on the absorber) and only harvest the direct component of sunlight. Non-concentrating collectors are typically used in residential and commercial buildings for space heating, while concentrating collectors are used in concentrated solar power plants generate electricity by heating a heat-transfer fluid to drive a turbine connected to an electric generator.

Preferably, a parabolic solar trough is used as the solar collector 103 in a preferred embodiment of the system of the present disclosure. A parabolic solar trough is a type of solar thermal collector that is straight in one dimension and curved as a parabola in the other two, lined with a polished metal mirror. The sunlight entering the mirror parallel to its plane of symmetry is focused along the focal line where objects are positioned that are intended to be heated.

However, in another embodiment, a parabolic dish may be used as the solar collector 103. The shape of a parabola means that incoming light rays which are parallel to the axis of the dish will be reflected toward the focus, regardless of the arrival direction of the light rays. Light from the sun arrives at the Earth's surface almost completely parallel, and the dish is aligned with its axis pointing at the sun, allowing almost all incoming radiation to be reflected towards the focal point of the dish. Most losses in such collectors are due to imperfections in the parabolic shape and imperfect reflection.

In a different embodiment, a power tower may be used as the solar collector 103. A power tower is a large tower surrounded by tracking mirrors called heliostats, wherein a heliostat is a device that includes a mirror, usually a plane mirror, which turns so as to keep reflecting sunlight toward a predetermined target, compensating for the sun's apparent motions in the sky. The target may be a physical object, distant from the heliostat, or a direction in space.

In other embodiments, solar towers, Freznel collectors, unglazed solar collectors, transpired solar air collectors, flat plate solar collectors, and evacuated tube solar collectors may be used if a non-concentrating collector is used with the system of the present disclosure.

In an unglazed solar collector, a heat-conducting material, usually a dark metal or plastic, absorbs sunlight and transfers the energy to a fluid passing through or behind the heat-conducting surface.

Most flat-plate collectors include a copper tubing and other heat-absorbing materials inside an insulated frame or housing, covered with clear glazing (glass). The-heat absorbing materials may have a special coating that absorbs heat more effectively than an uncoated surface.

Glazed flat-plate collectors can operate efficiently at a wider temperature range than unglazed collectors. Flat-plate collectors are often used to complement traditional water boilers, pre-heating water to reduce fuel demand, and can also be effective for space heating.

Transpired solar air collectors typically consist of a dark-colored, perforated metal cladding material mounted on an existing wall on the south side of a building. A fan pulls outside air through the perforations and into the space behind the metal cladding, where the air heats to as much as 30-Fahrenheit (° F.)-100° F. above the ambient air temperature.

Evacuated tube collectors feature thin, copper tubes filled with a fluid, such as water, housed inside larger vacuum-sealed clear glass or plastic tubes. Evacuated tube systems are typically more expensive than flat-plate collectors, but they are more efficient and can produce higher temperatures.

The heat exchanger 105 is used to transfer heat between two or more fluids. In the system of the present disclosure, the heat exchanger 105 is used to transfer heat between the first working fluid 101 and a second working fluid 201 of the S—$CO_2$ cycling unit 200. Generally, fluids are separated by a solid wall to prevent mixing. There are three primary classifications of heat exchangers according to their flow arrangement that may be used in the present disclosure. In parallel-flow heat exchangers, the two fluids enter the exchanger at the same end, and travel in parallel to one another to the other side. In counter-flow heat exchangers the fluids enter the exchanger from opposite ends. The counter current design is the most efficient, in that it can transfer the most heat from the heat (transfer) medium per unit mass due to the fact that the average temperature difference along any unit length is higher. In a cross-flow heat exchanger, the fluids travel roughly perpendicular to one another through the heat exchanger 105.

The type of the heat exchanger 105 used in the system of the present disclosure can be, but is not limited to, a shell and tube heat exchanger, a plate heat exchanger, a plate and shell heat exchanger, an adiabatic wheel heat exchanger, a plate fin heat exchanger, a pillow plate heat exchanger, a fluid heat exchanger, a dynamic scraped surface heat exchanger, a direct contact heat exchanger, or a microchannel heat exchanger.

Shell and tube heat exchangers consist of a series of tubes which contain fluid that must be either heated or cooled. A second fluid runs over the tubes that are being heated or cooled so that it can either provide the heat or absorb the heat required. A set of tubes is called the tube bundle and can be made up of several types of tubes: plain, longitudinally finned, etc. Shell and tube heat exchangers are typically used for high-pressure applications (with pressures greater than 30 bar and temperatures greater than 260-Celsius since shell and tube heat exchangers are robust due to their shape.

Plate heat exchangers are composed of many thin, slightly separated plates that have very large surface areas and small fluid flow passages for heat transfer. Advances in gasket and brazing technology have made the plate-type heat exchanger increasingly practical. In heating, ventilation, and air-conditioning (HVAC) applications, large heat exchangers of this type are called plate-and-frame; when used in open loops, these heat exchangers are normally of the gasket type to allow periodic disassembly, cleaning, and inspection. There are many types of permanently bonded plate heat exchangers, such as dip-brazed, vacuum-brazed, and welded plate varieties, and they are often specified for closed-loop applications such as refrigeration. Plate heat exchangers also differ in the types of plates that are used, and in the configurations of those plates.

Plate and shell heat exchangers combine plate heat exchanger technology with shell heat exchanger technology. Plate and shell heat exchangers contains a fully welded circular plate pack made by pressing and cutting round plates and welding them together. Nozzles carry flow in and out of the plate pack. The fully welded plate pack is assembled into an outer shell that creates a second flow path. Plate and shell technology offers high heat transfer, high pressure, high operating temperature, and close approach temperature. Gaskets are not used and thus, provides security against leakage at high pressures and temperatures.

In an adiabatic wheel heat exchanger, an intermediate fluid or solid store to hold heat, which is then moved to the other side of the heat exchanger to be released. Two examples of this are adiabatic wheels, which consist of a large wheel with fine threads rotating through the hot and cold fluids, and fluid heat exchangers.

If a plate fin heat exchanger is used, "sandwiched" passages containing fins are used to increase the effectiveness of the unit. The designs include crossflow and counter flow coupled with various fin configurations such as straight fins, offset fins and wavy fins. Plate and fin heat exchangers are usually made of aluminum alloys, which provide high heat transfer efficiency. The material enables the system to operate at a lower temperature difference and reduce the weight of the equipment. Plate and fin heat exchangers are often used for low temperature services such as natural gas, helium and oxygen liquefaction plants, air separation plants and transport industries such as motor and aircraft engines. A plate fin heat exchanger with "sandwiched" passages containing fins is preferred.

The pillow plate heat exchanger is constructed using a thin sheet of metal spot-welded to the surface of another thicker sheet of metal. The thin plate is welded in a regular pattern of dots or with a serpentine pattern of weld lines. After welding the enclosed space is pressurized with sufficient force to cause the thin metal to bulge out around the welds, providing a space for heat exchanger liquids to flow, and creating a characteristic appearance of a swelled pillow formed out of metal.

In a fluid heat exchanger, a gas passes upwards through a shower of fluid which is generally water, and the fluid is taken elsewhere before being cooled. Fluid heat exchangers are commonly used for cooling gases whilst also removing impurities.

Dynamic scraped surface heat exchangers are generally used for heating or cooling with high-viscosity products, crystallization processes, evaporation and high-fouling applications. Long running times are achieved due to the continuous scraping of the surface, thus avoiding fouling and achieving a sustainable heat transfer rate during the process.

Direct contact heat exchangers involve heat transfer between hot and cold streams of two phases in the absence of a separating wall. Thus, such heat exchangers can be classified as gas-liquid, immiscible liquid-liquid, and solid-liquid or solid-gas. Most direct contact heat exchangers fall under the gas-liquid category, where heat is transferred between a gas and liquid in the form of drops, films or sprays.

The first pump 107 is used to enable the flow of the first working fluid 101 within the first piping system 111. The type of pump used as the first pump 107 can be, but is not limited to, a piston pump, a circumferential-piston pump, diaphragm and bellows pumps, gear pumps, lobed pumps, nutating pumps, peristaltic pumps, centrifugal pumps, volute and diffuser pumps, propeller and mixed-flow pumps, and peripheral pumps.

Plunger or piston pumps are categorized as positive-displacement pumps, and usually contain one or more pistons that draw fluid through an inlet check valve and expel it through an outlet valve. The volume of fluid delivered depends on plunger diameter and stroke length; diameter cannot be varied in a given pump, so stroke length is made adjustable.

Circumferential-piston pumps use counter rotating rotors driven by external timing gears. They are self-priming and have high suction lift capability. With capacities up to 450 gallons per minute (gpm), the pumps are often used for shear-sensitive fluids, or those with entrained particles or gases.

Diaphragm and bellows pumps are used when pump leakage or process-fluid contamination cannot be tolerated. They offer the freedom from external leakage of a peristaltic pump, yet permit higher pressures and easy flow adjustment. Diaphragm and bellows pumps end to cost more than peristaltic pumps for the same flow delivered. Generally, diaphragm pumps are built like a plunger unit, except that a bellows or diaphragm is fitted to the end of the plunger shaft.

Gear pumps, often used in fluid-power applications, perform equally as well as fluid-handling pumps. The gears can be arranged as a pair of similarly sized gears, as three stacked gears, as separated internal gears, or as gerotors. Displacement of gear pumps is fixed, and cannot be varied during operation.

Lobed pumps resemble gear pumps. Motion of the rotors creates an expanding cavity on the inlet side, a constant-volume cavity that carries fluid to the outlet side, and a contracting cavity that forces fluid out. In some models, rotors are driven by external timing gears to avoid rotor contact in the fluid stream. Lobed pumps have relatively large displacement, so they are often used for shear-sensitive fluids, as well as fluids with entrained gases or particles.

Nutating pumps have a disc, held between two plates that wobbles without rotating and creates line contact with both plates. As the contact lines pass the inlet port, liquid is pulled into the cavities between the disc and plates. The fluid, then, is swept through the pump to the discharge port where it is released under pressure. A bridge separates inlet flow from outlet flow.

Peristaltic pumps includes a flexible tube that is progressively compressed by a series of rollers. As the rollers move along the tube, they force fluid through it. An advantage of these pumps is freedom from external leakage. Fluid is contained within the tube, and can leak only if the tube ruptures. Peristaltic pumps are simple and quite inexpensive for the flow rates they provide.

Centrifugal pumps are a practical choice for fairly constant, large flows of over 100 gpm at moderate pressures and low fluid viscosities. The first step in selecting a centrifugal pump is to determine application requirements: quantity of flow, pressure rise (or change in head) in feet of fluid, and other conditions such as high fluid viscosity or temperature.

Volute and diffuser pumps draw liquid into the impeller at its center and fling it outward by centrifugal force. The liquid leaves the impeller with higher pressure and velocity than when it entered. The velocity—especially its tangential component—is then partially transformed into additional pressure by the pump casing. The amount of energy transformed and efficiency of the transformation depend upon the shape of the casing.

In propeller pumps, liquid is drawn into the pump, parallel to the axis of the impeller, and is pushed out with no change in the direction of flow. Propeller pumps are available for vertical or horizontal operation.

Mixed-flow pumps can produce a larger range of heads than straight pumps. Because the rotors are similar to those in water turbines, this pump is often called a turbine pump. In a mixed-flow pump, the head is generated partly by propeller action and partly by centrifugal force in a volute casing. As with the propeller type, the mixed-flow pump can have only a single-section inlet. Thus, the mixed flow pump bridges the gap between the propeller and purely centrifugal types.

Peripheral pumps have circular, rotating impellers but provide characteristics similar to those of a positive-displacement pump. These low-volume, high-head pumps deliver 1 to 50 gpm and up to 500 feet (ft) of head discharge. These pumps have excellent suction characteristics, drawing up to 28 ft of head. They are sometimes called turbine-vane, viscous-drag, or regenerative pumps. Peripheral pumps usually cost less than centrifugal or positive-displacement pumps, but often have a much shorter life.

The first working fluid 101 may operate at a temperature ranging from about 175° F. (79.4° C.) to 975° F. (524° C.), 195° F. (90.5° C.) to 950° F. (510° C.) with a preferred temperature ranging from 212° F. (100° C.) to 932° F. (500° C.). In one embodiment, the first working fluid 101 is a synthetic hydrocarbon mixture, e.g., Therminol®. Therminol is a synthetic heat transfer fluid produced by Eastman Chemical Company. A heat transfer fluid is defined as a substance that is used to reduce or regulate the temperature of a system. In general, Therminols have an operational temperatures ranging from about −115° C. (−175° F.) to 400° C. (750° F.).

The first working fluid 101 can be, but is not limited to, Therminol VLT heat transfer fluid, Therminol D12 heat transfer fluid, Therminol ADX-10 heat transfer fluid, Therminol RD heat transfer fluid, Therminol 54 heat transfer fluid, Therminol 55 heat transfer fluid, Therminol SP heat transfer fluid, Therminol 58 heat transfer fluid, Therminol LT heat transfer fluid, Therminol 59 heat transfer fluid, Therminol XP heat transfer fluid, Therminol 62 heat transfer fluid, Therminol VP-3 heat transfer fluid, Therminol 66 heat transfer fluid, Therminol 68 heat transfer fluid, Therminol 72 heat transfer fluid, Therminol 75 heat transfer fluid, and/or Theminol Flush Fluid (FF).

Therminol VLT is a synthetic liquid phase heat transfer fluid with excellent heat transfer and fluid properties for extremely low temperature applications. This fluid is ideally suited for single fluid heating and cooling systems.

Therminol D-12 is a synthetic liquid phase heat transfer fluid with excellent heat transfer properties over a wide temperature range. This fluid is ideally suited for applications requiring efficient cooling and heating.

Therminol ADX10 is a low viscosity, synthetic organic heat transfer fluid particularly recommended for indirect liquid phase process heating at medium temperatures.

Therminol RD is a low viscosity heat transfer fluid particularly recommended for indirect heating at medium temperatures, where low temperature pumpability is required.

Therminol 54 is a synthetic fluid designed to provide reliable, consistent heat transfer performance over a long service life at maximum bulk temperatures up to about 280-Celsius (° C.) (540-Fahrenheit (° F.)).

Therminol 55 is a synthetic heat transfer fluid used in moderate temperature applications. Therminol 55 fluid is designed for use in non-pressurized/low-pressure, indirect heating systems. It delivers efficient, dependable, uniform process heat with no need for high pressures.

Therminol SP is a synthetic heat transfer fluid used in moderate temperature applications. Therminol SP fluid is designed for use in non-pressurized/low-pressure, indirect heating systems. It delivers efficient, dependable, uniform process heat with no need for high pressures.

Therminol 58 is an efficient, reliable, medium-temperature synthetic fluid engineered to deliver exceptional heat transfer performance at maximum bulk temperatures up to 300° C. (575° F.).

Therminol LT is a synthetic aromatic heat transfer fluid. It can be used in both liquid phase and vapor phase, and has excellent heat transfer and fluid properties for low temperature applications.

Therminol 59 is a synthetic heat transfer fluid with excellent low temperature pumping characteristics and thermal stability.

Therminol XP heat transfer fluid is an extremely pure white mineral oil which provides reliable heat transfer.

Therminol 62 is a synthetic heat transfer fluid whose chemistry is custom contoured for high-performance, high-purity, low-pressure and exceptional thermal stability.

Therminol VP3 heat transfer fluid is a synthetic heat transfer fluid that was specially developed to allow vapor phase heat transfer at lower temperatures than are practical with traditional diphenyl oxide (DPO)/biphenyl constituted fluids like Therminol VP-1.

Therminol 66 is a high temperature, liquid phase heat transfer fluid. Therminol 66 is pumpable at low temperatures, and offers high temperature thermal stability.

Therminol 68 is a high temperature liquid phase heat transfer fluid with excellent thermal stability. Therminol 68 was developed for use at temperatures up to 360° C. (680° F.) in liquid phase heat transfer fluid systems. Therminol 68 has a boiling point of 308° C. (586° F.), but static pressure of about 2 bar should maintain the liquid phase at high temperatures.

Therminol 72 is an ultra-high temperature liquid phase heat transfer fluid having excellent thermal stability. Therminol 72 was developed for use at temperatures up to 380° C. (720° F.) in liquid phase heat transfer systems.

Therminol 75 synthetic heat transfer fluid is an ultra-high temperature liquid phase heat transfer fluid having excellent thermal stability.

Therminol FF is the first synthetic flushing fluid for liquid phase heat transfer systems. Deposits from oxidized, thermally degraded or contaminated fluid can foul interior surfaces, making it necessary to clean the system prior to charging with new fluid.

In another embodiment, the first working fluid 101 may be molten salt. Molten salt is salt which is solid at standard temperature and pressure but enters the liquid phase due to elevated temperature. In most molten salt energy storage systems, the molten salt is maintained as a liquid throughout the energy storage process. Molten salts are typically made up of about 60% sodium nitrate and about 40% potassium nitrate, and the salts melt at approximately 220° C. Molten salts are often used with concentrating solar power (CSP) plants to store thermal energy for electricity generation. In CSP plants, excess heat that is not used for electricity generation is diverted to the molten salt, which is then stored in an insulated tank. After sunset, the stored thermal energy can be used to produce steam and generate electricity when the sun is no longer providing energy to the CSP plant.

In another embodiment, the first working fluid 101 may be HITEC® salt, HITEC XL salt, Solar salt, Biphenyl/Diphenyl oxides, Sodium (Na) nitrate, Potassium (K) nitrate, Lithium nitrate (Li), Lithium carbonate, Potassium carbonate, Sodium Carbonate, Lithium fluoride, Potassium fluoride, Sodium fluoride, or a Sanida Mix. See K. Vignarooban, Xinhai Xu, A. Arvay, K. Hsu, A. M. Kannan (2015). "Heat Transfer Fluids for Concentrating Solar Power Systems—A Review". *Applied Energy* 146:383-396 incorporated herein by reference in its entirety.

The solar cycling unit 100 further comprises a thermal energy storage (TES) 106 which is in fluid communication with the first pump 107 to provide thermal energy to the first working fluid 101. In particular, the TES 106 stores excess thermal energy received from the solar collector 103 by storing the first working fluid 101 to be used during low solar radiation and/or during the night and thus, may be used to provide cooling effects during the night as well.

In another embodiment of the present disclosure the TES 106 is a reservoir that contains the working fluid 101. A large volume of the working fluid (e.g., total 101 volume in TES and 111 is 3-10 times the total volume present in 111) serves to provide a temperature buffer and maintain a relatively constant temperature of the working fluid during the cycle. The TES 106 may be in the form of a liquid reservoir that is integrated with the pump 107. For example, the TES may be an insulated tank or container which encases or surrounds the pump 107 such that the pump has essentially the same temperature as the working fluid 101 during a cycle. Any excess heat formed electrically or mechanically by the pump 107 is captured by the working fluid and further maintains a stable temperature within the TES and the working fluid. A pump that is encased or surrounded by the TES includes constructions in which the TES is in the form of a liquid container or reservoir that includes an inset that physically separates the material present in TES (for example the working fluid) from direct contact with the exterior of the pump 107. The pump is present in an indentation, preferably at the top of the GES reservoir or container, such that it is separated from the liquid material present in the reservoir but is nonetheless maintained at a consistent temperature of any material within TES and is otherwise covered by an insulated covering that is contiguous with any insulation covering on the GPS reservoir container.

The TES 106 used in the system of the present disclosure can be, but is not limited to, a sensible heat storage, a latent heat storage, or a thermochemical storage. In sensible heat storage, the temperature of a storage medium is shifted without phase change. In particular, the storage system exchanges solar energy into sensible heat in a storage medium (usually solid or liquid) and releases when necessary. The amount of stored sensible heat in a material depends on the heat capacity and thermal diffusivity.

Latent heat storage uses the phase transition of a material. Usually solid-liquid phase change is used, by melting and solidification of a material. Upon melting heat is transferred to the material, storing large amounts of heat at constant temperature; the heat is released when the material solidifies. Materials used for latent heat storage are called phase change materials (PCM).

Thermochemical storage (TCS) systems store energy in endothermic chemical reactions, and the energy can be retrieved at any time by facilitating the reverse, exothermic reaction. The storage output temperature is dependent on the properties of the thermochemical that was used as the storage medium. Typically, thermochemical energy storage refers to two main processes, thermochemical reactions and sorption processes. Thermal adsorption reactions can be used to store heat or cold in the bonding of a substance to another solid or liquid. A common sorption process used in TCS systems is the adsorption of water vapor to silica gel or zeolites. During charging, the water is desorbed from the inner surface of the adsorbent and is adsorbed again when the stored energy is discharged from the system. Alternatively, heat can be stored by directing thermal energy to an endothermic chemical reaction. In this reaction, a thermochemical absorbs the energy and splits into separate substances, which can be stored until the energy is needed again. The reverse reaction occurs when the two substances are recombined and thermal energy is released through this exothermic reaction.

As further illustrated in FIGS. 9-15, the S—$CO_2$ cycling unit 200 comprises a second working fluid 201, a second pump 203, a first condenser 205, and a turbine 207, wherein the second pump 203 and the first condenser 205 are in fluid communication through a second piping system 209 carrying a second working fluid 201. Similar to the operation of the first pump 107, the second pump 203 is used to enable the flow of the second working fluid 201 within the second piping system 209. The second pump 203 is operatively coupled with the turbine 207, such that the flow from the second pump 203 can be used to control the rotational motion of the turbine 207.

A condenser is a device or unit used to condense a gaseous substance into a liquid state through cooling. The condenser relies on the heat transfer that occurs during phase changes. In one embodiment, an air cooled condenser may be used as the first condenser 205. Air cooled condensers are generally used in plants where the cooling load is small and the total quantity of the refrigerant in the refrigeration cycle is small compared to the overall quantity of the refrigerant in the system. Air cooled condensers are also called coil condensers as they are usually made of copper or aluminum coil. Air cooled condensers occupy a comparatively larger space than water cooled condensers. Air cooled condensers may be of two types: natural convection and forced convection. In the natural convection type, the air flows over naturally depending upon the temperature of the condenser coil. In the forced air type, a fan operated by a motor blows air over the condenser coil.

In another embodiment, a water cooled condenser may be used as the first condenser 205. Generally, water cooled condensers are used for large refrigerating plants, big packaged air-conditioners, central air-conditioning plants, etc. These are used in plants where cooling loads are excessively high and a large quantity of refrigerant flows through the condenser. There are three types of water cooled condensers: tube-in-tube or double pipe type, shell and coil type and shell and tube type, and the refrigerant flows through one side of the piping while the water flows through the other piping, cooling the refrigerant and condensing.

In a different embodiment, an evaporative condenser may be used as the first condenser 205. Evaporative condensers are a combination of water cooled and air cooled condensers. In these condensers the hot refrigerant flows through the coils and water is sprayed over the coils. At the same time the fan draws air from the bottom side of the condenser and discharges it from the top side of the condenser. The spray water that comes in contact with the condenser coil gets evaporated in the air and it absorbs the heat from the condenser, cools the refrigerant and condenses it.

The turbine 207 is used to produce work by expanding the second working fluid 201. In one embodiment, the turbine 207 will be a single stage turbine. In another embodiment, the turbine 207 will be a multistage turbine. Based on the principle of operation, the turbine 207 used in the system of the present disclosure can be an impulse turbine in one embodiment, wherein the impulse turbine is driven by a high-velocity jet or multiple jets of water. In another embodiment, a reaction turbine may be used as the turbine 207, wherein the rotor of the reaction turbine is fully immersed in water and is enclosed in a pressure casing. The runner blades of the reaction turbine are profiled so that pressure differences across the blades impose lift forces such that the runner is forced to rotate faster than a water jet. In a different embodiment, a gravity turbine may be used as the turbine 207. A gravity turbine is driven by the weight of water entering the top of the turbine and falling the bottom of the turbine to be released.

Preferably, the second working fluid 201 is supercritical carbon dioxide (S—$CO_2$), wherein S—$CO_2$ is a fluid state of carbon dioxide where it is held at or above its critical temperature and critical pressure. Critical temperature is the temperature of a gas or vapor in its critical stage. Above the critical temperature a gas cannot be liquefied by pressure alone. On the other hand, critical pressure of a substance is the pressure required to liquefy a gas at its critical temperature. Carbon dioxide usually behaves as a gas in air at standard temperature and pressure (STP), or as a solid called dry ice when frozen. If the temperature and pressure are both increased from STP to be at or above the critical point for carbon dioxide, it can adopt properties midway between a gas and a liquid. More specifically, it behaves as a supercritical fluid above its critical temperature (304.25 Kelvin (K), 31.10° C., 87.98° F.) and critical pressure (72.9 atmosphere (atm), 7.39 Megapascal MPa, 1,071 pounds per square inch (psi), 73.9 bar), expanding to fill its container like a gas but with a density like that of a liquid. S—$CO_2$ is chemically stable, reliable, low-cost, non-toxic, non-flammable and readily available, alternately 87.8° F. (30.98 C) to 1,300° F.-1,500° F. (700-800 C).

The solar cycling unit 100 is in thermal communication with the S—$CO_2$ cycling unit 200 through the heat exchanger 105. Therefore, heat absorbed by the first working fluid 101 may be transferred to the second working fluid 201 at the heat exchanger 105. The first piping system 111 passes through the heat exchanger 105. To transfer heat, the second piping system 209 also passes through the heat exchanger 105 and into the turbine 207.

As further illustrated in FIGS. 9-15, the refrigerant cycling unit 300, which is used to provide cooling effects, comprises a third working fluid 301, a compressor 303, a second condenser 305, an evaporator 307, and at least one expansion valve 309 which are in fluid communication through a third piping system 315 carrying the third working fluid 301.

The type of compressor used in the refrigerant cycling unit 300 can be, but is not limited to, a reciprocating compressor, a rotary compressor, a screw compressor, a centrifugal compressor, or a scroll compressor.

Reciprocating compressors have a piston and cylinder arrangement similar to an automotive engine. The reciprocating motion of the piston due to external power compresses the refrigerant inside the cylinder. There are three types of reciprocating compressors: hermetically sealed, semi-hermetically sealed and open type. In hermetically sealed compressor, the compressor and the motor are enclosed in the welded steel casing and the two are connected by a common shaft. A semi-hermetic uses a large cast metal shell with gasket covers with screws that can be opened to replace motor and compressor components. Open compressors rely on shaft seals to retain the internal pressure, and these seals require a lubricant such as oil to retain their sealing properties. An open pressurized system such as an automobile air conditioner can be more susceptible to leak its operating gases. Open systems rely on lubricant in the system to splash on pump components and seals. The opening of reciprocating compressors can be of single cylinder type or multi-cylinder type.

The screw compressors preferably comprise a pair of meshing screws between which the refrigerant gets compressed. They can produce high pressure for small quantity of gas. Generally, screw compressors consume less power than the reciprocating compressors.

The rotary compressors have two rotating elements, like gears, between which the refrigerant is compressed. These compressors can pump the refrigerant to lower or moderate condensing pressures.

In general, centrifugal compressors include an impeller or a blower that can handle large quantities of gas at relatively lower condensing pressures.

The scroll compressor comprises of two interleaved scrolls of which one is fixed and the other orbits eccentrically without rotating. During its motion small gaps are created between the scrolls where the refrigerant gets compressed. The scrolls can have different shapes like involute, Archimedean spiral or hybrid curve. In another arrangement both the scrolls may be rotating eccentrically to produce the compression.

Similar to the first condenser 205, the second condenser can be a water cooled condenser, an air cooled condenser, or an evaporative condenser in different embodiments of the system described in the present disclosure.

The evaporator 307 used in the refrigerant cycling unit 300 enables heat transfer between air and the third working fluid 301 to cool the air. The evaporator 307 used in the system of the present disclosure can be a bare tube evaporator in one embodiment. Bare tube operators are made up of copper tubing or steel pipes. The copper tubing is used for small evaporators where the refrigerant other than ammonia is used, while the steel pipes are used with the large evaporators where ammonia is used as the refrigerant. The bare tube evaporator comprises of several turns of the tubing, though most commonly flat zigzag and oval trombone are the most common shapes. The bare tube evaporators are usually used for liquid chilling. In the blast cooling and the freezing operations the atmospheric air flows over the bare tube evaporator and the chilled air leaving it used for the cooling purposes.

In a different embodiment, plate type evaporators may be used within the system of the present disclosure as the evaporator 307. In plate type evaporators, the coil is usually made up of copper or aluminum and is embedded in the plate so as to form a flat looking surface. Externally the plate type of evaporator looks like a single plate. However, internally several turns of the metal tubing exists through which the refrigerant flows. The advantage of the plate type of evaporators is that they are more rigid as the external plate provides lots of safety. The external plate also helps increasing the heat transfer from the metal tubing to the substance to be chilled. Further, the plate type of evaporators are easy to clean and can be manufactured cheaply.

In a different embodiment, finned evaporators may be used as the evaporator 307 in the system of the present disclosure, wherein a finned evaporator is a bare tube type evaporator covered with fins. The fins are external protrusions from the surface of the coil that extend into open space. The fins help remove the heat from the fluid that otherwise would not have come in contact with the coil.

The at least one expansion valve 309 is used to expand the third working fluid 301 used with the refrigerant cycling unit 300. In general, an expansion valve serves two purposes. Firstly, the expansion valve controls the amount of the third working fluid 301 entering the evaporator 307. If the capacity of the evaporator 307 increases, the at least one expansion valve 309 should allow a larger flow of the third working fluid 301, and vice versa. A smaller refrigerant mass flow results in a higher level of superheating, because less surface area is required for evaporation. Secondly, the at least one expansion valve 309 is intended to maintain the pressure difference between the second condenser 305, which is at high pressure, and the evaporator 307 which is at a lower pressure. In particular, the pressure difference created by the work of the compressor 303 is maintained by the at least one expansion valve 309. Preferably, the evaporator 307 seen in FIG. 9 operates within a temperature ranging from about −20° F. (−29° C.) to 90° F. (32° C.), −15° F. (−26° C.) to 88° F. (31° C.) with a preferable temperature ranging from about −13° F. (−25° C.) to 86° F. (30° C.). A discharge temperature of the compressor 303 is preferably less than approximately 212° F. (100° C.) to prevent carbonization and oil breakdown. On the other hand, the second condenser 305 operates at a temperature that is between a discharge temperature of the evaporator 307 and a discharge temperature of the compressor 303.

The third working fluid 301 is preferably tetrafluoroethene. Tetraflouroethene, also known as R-134A, is a hydrofluorocarbon (HFC) and haloalkane refrigerant with thermodynamic properties similar to R-12 (dichlorodifluoromethane) but with insignificant ozone depletion potential and a significantly lower global warming potential. The boiling point of R-134A is within a range of −20° F. to −12° F., with a preferable value of about −14.9° F. (−26.1° C.). The auto ignition temperature, which is the lowest temperature at which a substance spontaneously ignites in normal atmosphere without an external source of ignition, is within a range between 1400° F.-1450° F., 1400° F.-1415° F. with a preferable value of about 1418° F. (770° C.). The solubility in water for R-134A is within a range of 0.1%-0.15% for a temperature within a range of 70° F.-80° F. The critical temperature of R-134A is within a range of 245° F.-260° F., 250° F.-260° F., with a preferable value of about 252° F. The cylinder color code for R-134A is light blue. In another embodiment, similar to the second working fluid 201, S—$CO_2$ may be used as the third working fluid 301.

In other embodiments, R717 (Ammonia), R290 (Propane), R152a (1,1-Difluoroethane), R410a, which is an azeotropic mixture of difluoromethane ($CH_2F_2$, called R-32) and pentafluoroethane ($CHF_2CF_3$, called R-125), R600a (Isobutane), 2,3,3,3-Tetrafluoropropene, R12-Dichlorodifluoromethane, and water may be used as the third working fluid 301.

In a preferred cycle performed by the system described in the present disclosure, the S—$CO_2$ cycling unit 200 powers the second pump 203 for different cycles using a mutual shaft 109 extending from the turbine 207. To do so, the S—$CO_2$ cycling unit 200 is operatively coupled with the refrigerant cycling unit 300 to compress the third working fluid 301 to produce the cooling effect. In a preferred embodiment, as seen in FIG. 9, the first pump 107, the second pump 203, and the turbine 207 are rotatably engaged to each other through the mutual shaft 109.

Figure 10:
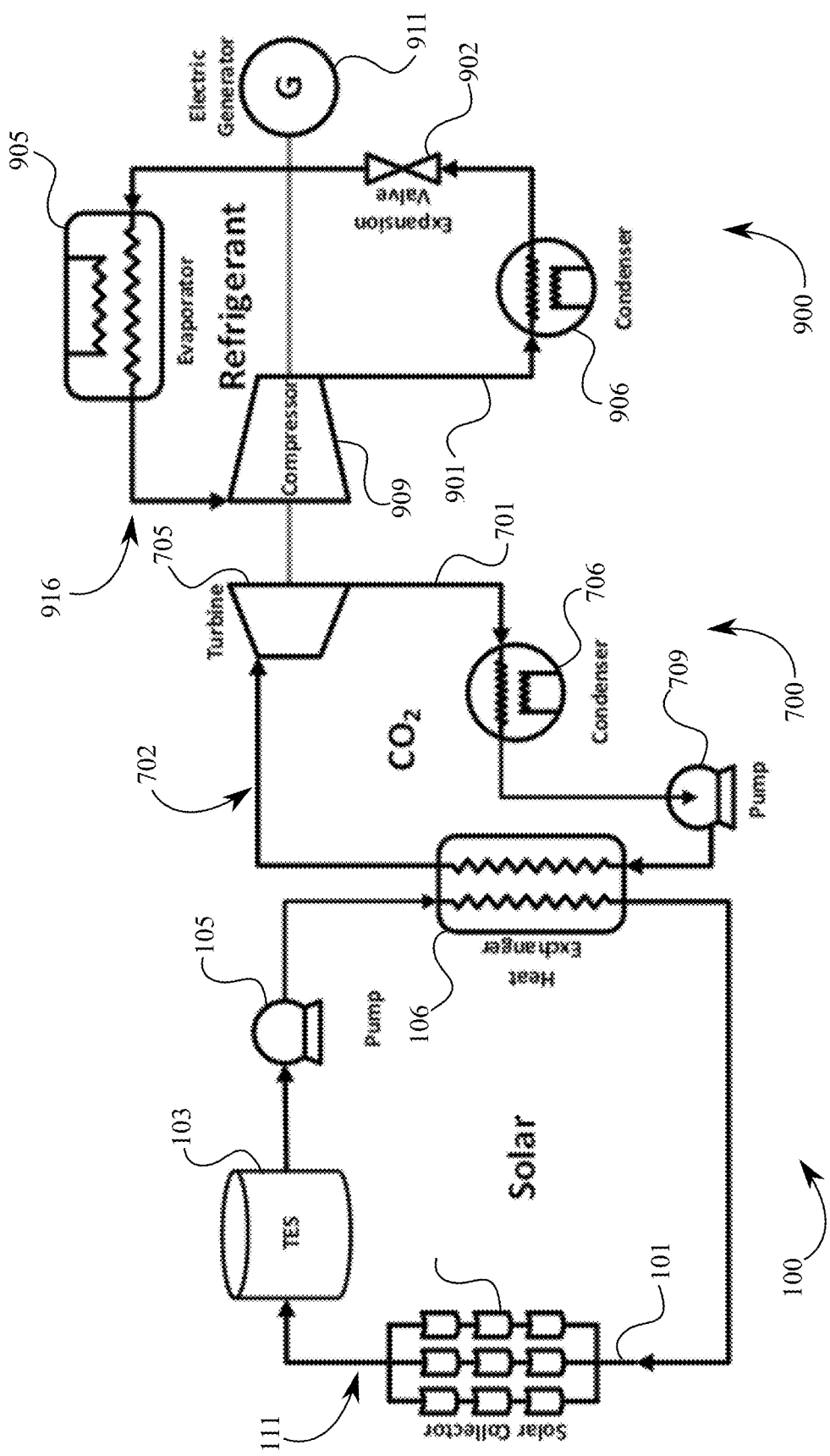
FIG. 10 is a schematic diagram of a proposed cycle of the system of the present disclosure, wherein a first pump of the solar cycling unit and a second pump of a S—$CO_2$ cycling unit are not rotatably engaged through a mutual shaft, wherein a refrigerant cycling unit comprises an electric generator.

In a different embodiment of the system of the present disclosure, as seen in FIG. 10, when the first pump 107 the second pump 203 are not rotatably engaged with the mutual shaft 109, the refrigerant cycling unit 300 further comprises an electric generator 311. The second pump 203 is rotatably engaged to the turbine 207 that is operatively coupled with the compressor 303, the electric generator 311, and the second condenser 305. In particular, the turbine 207 powers the electric generator 311 along with the second condenser 305. The energy produced from the turbine 207 may be used to power the first pump 107 and the second pump 203.

The electric generator 311 can be integrated into all cycles that can be performed by the system described in the present disclosure. In general, a generator is a device that converts mechanical energy/motive power into electrical power for use in an external circuit. In one embodiment, alternating current (AC) generators may be used as the electric generator 311. AC generators are classified as single-phase or polyphaser. A single-phase generator is usually limited to approximately 25 kilowatt (kW) or less and generates AC power at a specific utilization voltage. Polyphase generators produce two or more alternating voltages.

In another embodiment, a direct current (DC) generator may be used as the electric generator 311. DC generators are classified as either shunt, series, or compound-wound. Most DC generators are compound-wound type. Shunt generators are usually used as battery chargers and as exciter for AC generators. The electromagnetic force induced in a DC generator alternates. Thus, rectification is required to direct the flow of current in one direction. Generally, the generator rotating commutator provides the rectifying action.

Figure 11:
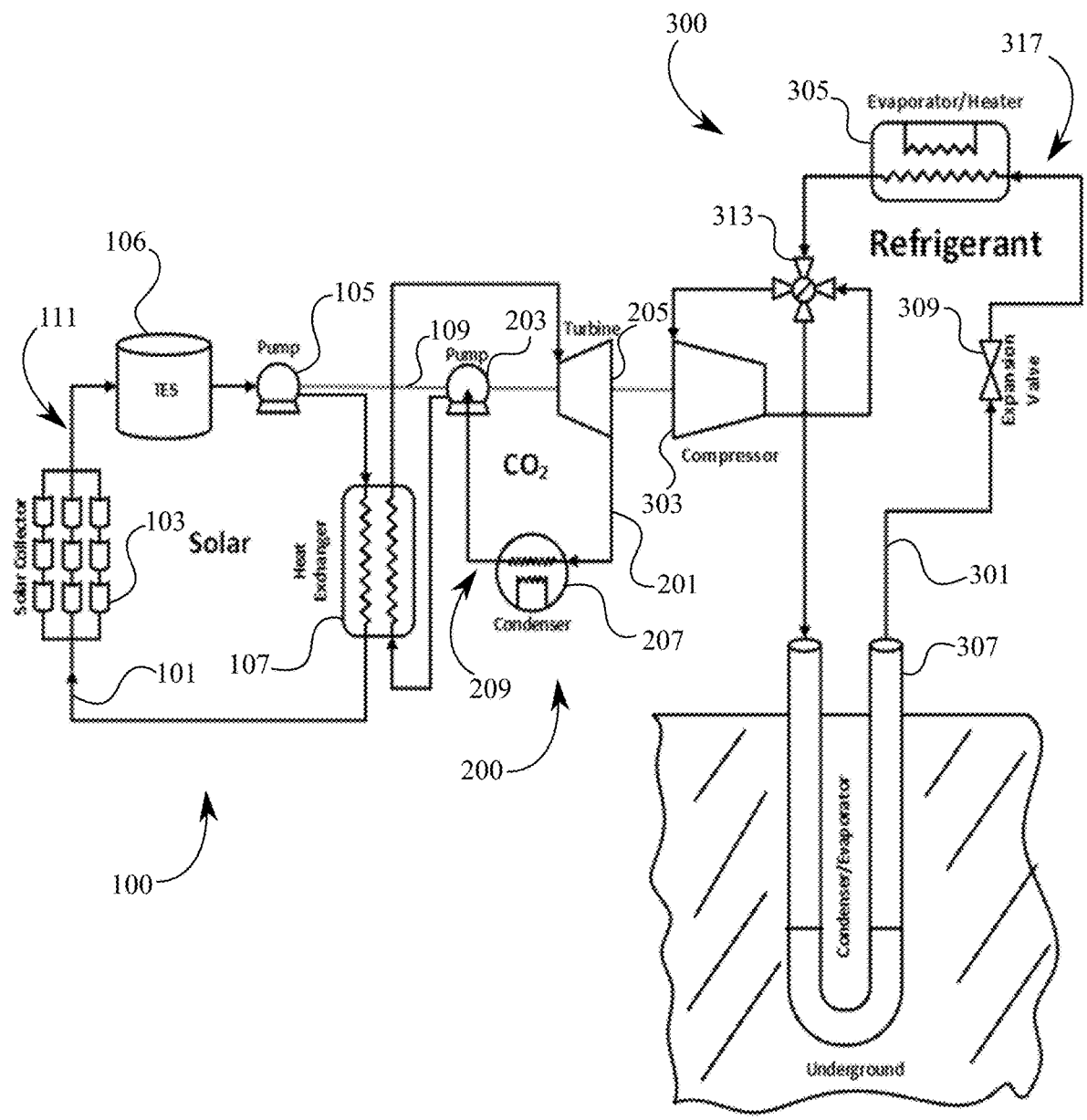
FIG. 11 is a schematic diagram of a cycle of the system of the present disclosure, wherein the refrigerant cycling unit comprises a four way valve and a geothermal heat exchanger.

As seen in FIG. 11, in a cycle encompassed by the system of the present disclosure, the refrigerant cycling unit 300 further comprises a four way valve 313 which is integrated into the third piping system 315. The four way valve 313 allows the refrigerant cycling unit 300 to be used in winter weather conditions for heating and in summer weather conditions for cooling. When the second condenser 305 is a geothermal heat exchanger, the compressor 303, the four way valve 313, the evaporator, the at least one expansion valve 309, and the geothermal heat exchanger are in fluid communication with each other through the third piping system 315 carrying the third working fluid 301. The geothermal heat exchanger may be used as an evaporator in winter weather conditions and as a condenser in summer weather conditions.

In one embodiment of the present disclosure, the geothermal heat exchanger may be a closed loop system. The loop of a closed loop system can be in a horizontal, vertical, or pond/lake configuration.

Horizontal installation is generally the most cost-effective for residential installations, particularly for new construction where sufficient land is available and requires trenches at least four feet deep. The most common layouts either use two pipes, one buried at six feet, and the other at four feet, or two pipes placed side-by-side at five feet in the ground in a two-foot wide trench.

Large commercial buildings and schools often use vertical systems because the land area required for horizontal loops would be prohibitive. Vertical loops are also used where the soil is too shallow for trenching minimizing the disturbance to existing landscaping. For a vertical system, holes (approximately four inches in diameter) are drilled about 20 feet apart and 100 to 400 feet deep and two pipes that are connected at the bottom with a U-bend to form a loop are inserted to the holes. The vertical loops are connected with horizontal pipe (i.e., manifold), placed in trenches, and connected to the heat pump in the building.

If the site at which the system of the present disclosure is implemented in has an adequate water body, the pond/lake configuration may be option with the lowest cost. A supply line pipe is run underground from the building to the water and coiled into circles at least eight feet under the surface to prevent freezing. The coils should only be placed in a water source that meets minimum volume, depth, and quality criteria.

In another embodiment, the geothermal heat exchanger may be an open-loop system. In open-loop systems, well or surface body water is used as the heat exchange fluid that circulates directly through the geothermal heat exchanger.

In a different embodiment, the geothermal heat exchanger may be a hybrid system. Hybrid approaches are particularly effective where cooling needs are significantly larger than heating needs.

Figure 12:
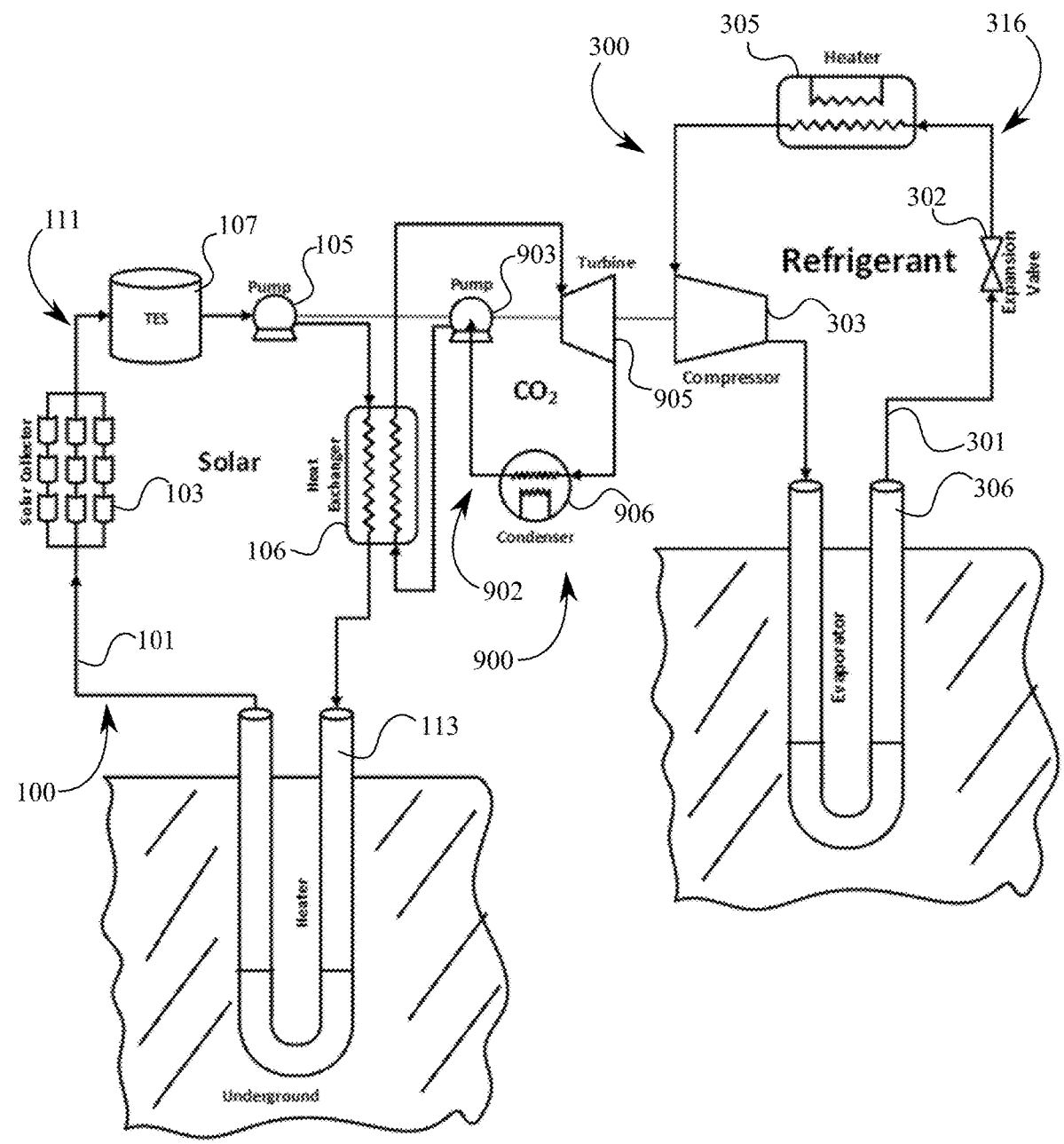
FIG. 12 is a schematic diagram of a cycle of the system of the present disclosure configured for winter operation when solar energy is low and the ambient temperature is low.

As seen in FIG. 12, in a different cycle performed by the system of the present disclosure, the solar cycling unit 100 further comprises a geothermal heat exchanger 113 and the second condenser 305 of the refrigerant cycling unit 300 is a geothermal heat evaporator. The solar collector 103, the first pump 107, the heat exchanger 105, and the geothermal heat exchanger 113 of the solar cycling unit 100 are in fluid communication through the first piping system 111 carrying the first working fluid 101. With the use of the geothermal heat exchanger 113 in the solar cycling unit 100, the system of the present disclosure may be used for winter operation. In particular, the cold fluid from the heat exchanger 105 is passed through the geothermal heat exchanger 113 of the solar cycling unit 100 to be preheated and then transferred onto the solar collector 103. On the other hand, the geothermal heat evaporator of the refrigerant cycling unit 300 is used to absorb heat from the ground which is at a higher temperature than the atmospheric air during winter weather conditions. To fulfill heat absorbing and evaporating requirements, both the geothermal heat exchanger 113 of the solar cycling unit 100 and the geothermal heat evaporator of the refrigerant cycling unit 300 are preferably positioned underground. By using the geothermal heat exchanger 113 in the solar cycling unit 100 and the geothermal heat evaporator in the refrigerant cycling unit 300, cooling and heating requirements may be completed even when solar energy and the ambient temperature is low. Moreover, the overall size of the solar collector 103 used to harness solar energy, and the overall size of the TES 106 may be reduced. In particular, the reduction in size of the solar collector 103 and the heat extracted from the geothermal heat exchanger 113 has a linear relationship. Therefore, the size of the solar collector 103 reduces with a rise in the amount of heat extracted by the geothermal heat exchanger 113. The amount of heat that can be extracted from the geothermal heat exchanger 113 is dependent on the depth and the location of the reservoir.

Figure 13:
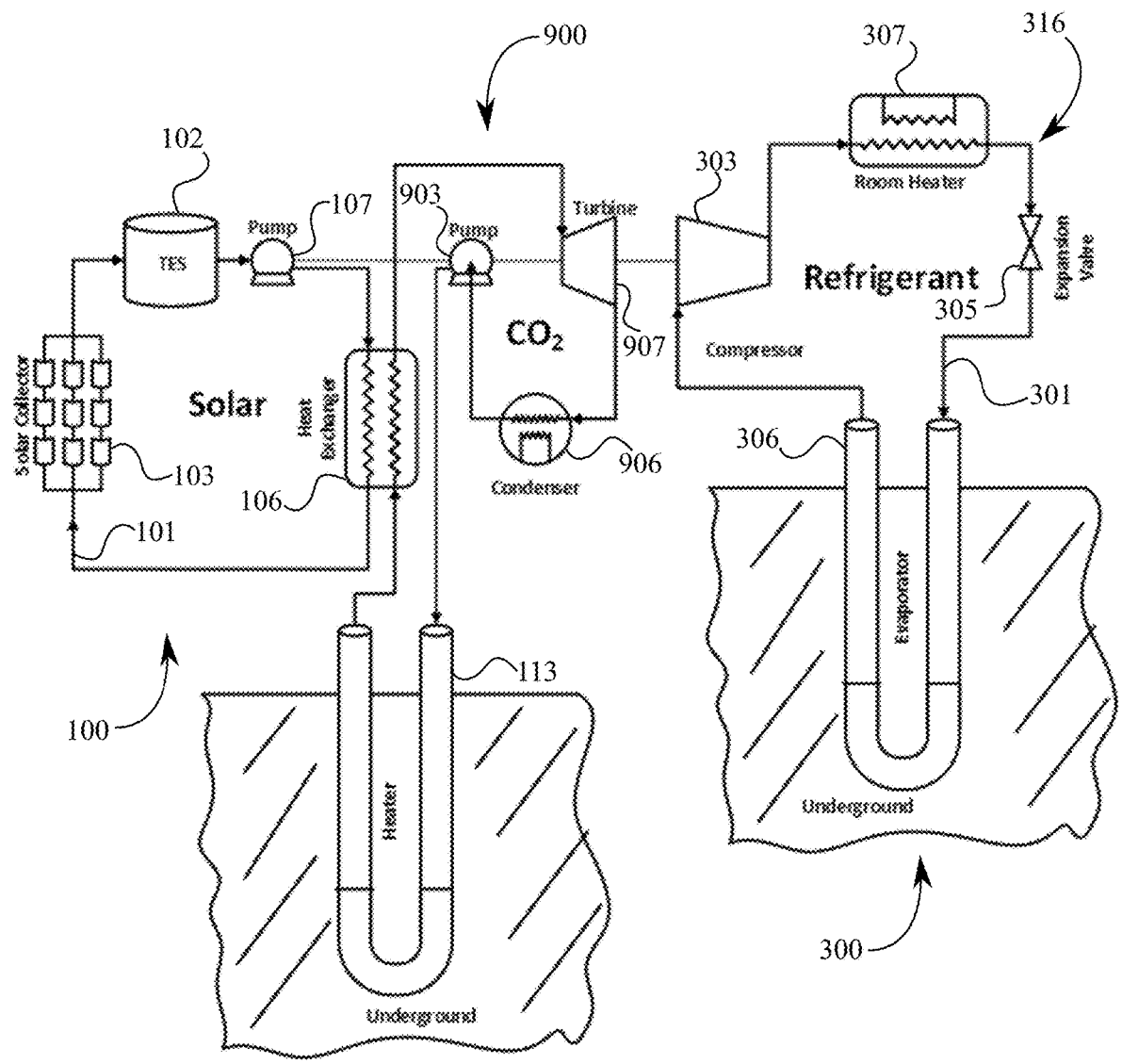
FIG. 13 is a schematic diagram of a cycle of the system of the present disclosure configured for winter operation, wherein a second working fluid passing through a S—$CO_2$ cycling unit of the present disclosure is preheated in order to compensate for low solar radiation.

As seen in FIG. 13, in a different cycle performed by the system of the present disclosure, the S—$CO_2$ cycling unit 200 further comprises a geothermal heat exchanger 113 and the second condenser 305 of the refrigerant cycling unit 300 is a geothermal heat evaporator. The geothermal heat exchanger 113 may be used to preheat the second working fluid 201 transferred to the S—$CO_2$ cycling unit 200 such that the S—$CO_2$ cycling unit 200 may be used during winter weather conditions to compensate for low solar radiation. To do so, the heat exchanger 105 of the solar cycling unit 100, the second pump 203, the first condenser 205, and the geothermal heat exchanger 113 of the S—$CO_2$ cycling unit 200 are in fluid communication through the second piping system 209 carrying the second working fluid 201. The geothermal heat exchanger of the S—$CO_2$ cycling unit 200 may be used to reduce the overall size of the solar collector 103 and the TES 106 since an underground temperature may be warmer than the ambient temperature during winter weather conditions and during night time.

Figure 14:
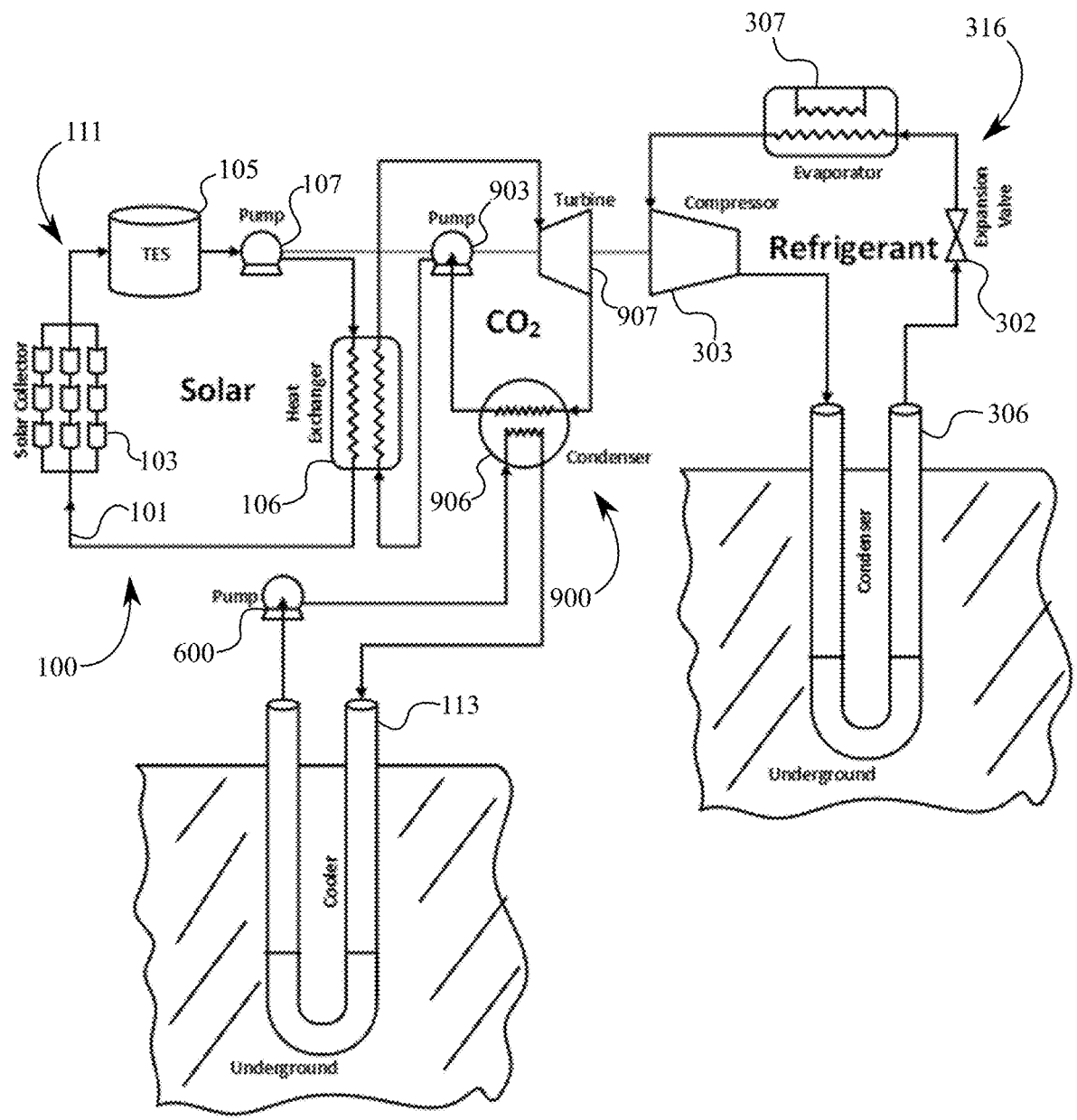
FIG. 14 is a schematic diagram of a cycle of the system of the present disclosure configured for summer operation, wherein a condenser of the S—$CO_2$ cycling unit is cooled with an underground geothermal heat exchanger.

As seen in FIG. 14, in a different cycle performed by the system of the present disclosure, the S—$CO_2$ cycling unit 200 further comprises a geothermal heat exchanger 113. In contrast to previous embodiments, the first condenser 205 is in thermal communication with the geothermal heat exchanger 113 through a secondary pump 500. Thus, the first condenser 205 may be maintained at a cooler temperature using the geothermal heat exchanger which is at a lower temperature than the ambient temperature due to the underground positioning. On the other hand, the second condenser 305 of the refrigerant cycling unit 300, which is a geothermal heat exchanger, emits heat to the much cooler surrounding ground. To do so, the compressor 303, the evaporator, the at least one expansion valve 309, and the geothermal heat exchanger are in fluid communication with each other through the third piping system 315 carrying the third working fluid 301.

Figure 15:
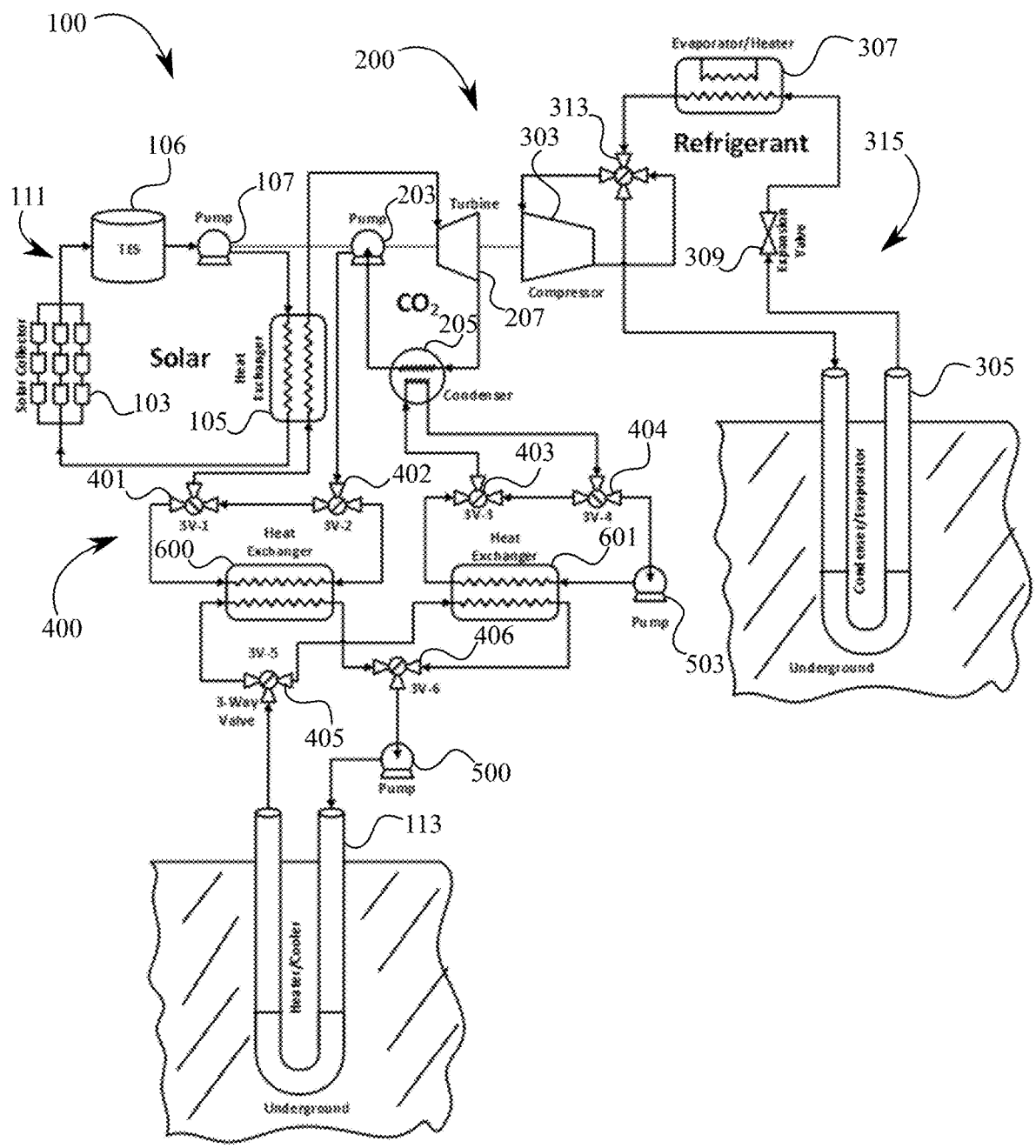
FIG. 15 is a schematic diagram of a cycle of the system of the present disclosure configured for winter and summer operation, wherein a plurality of three way valves is used to provide a heating effect during winters and a cooling effect during the summer.

As seen in FIG. 15, in a different cycle performed by the system described in the present disclosure, the system of the present disclosure further comprises a plurality of three way valves 400. The plurality of three way valves 400 is used to manage a geothermal heat exchanger 113 to cool the first condenser 205 during warm weather conditions and heat the first condenser 205 during cold weather conditions. The heat exchanger 105 is in fluid communication with a first three way valve 401 from the plurality of three way valves 400. The second pump 203 is in fluid communication with a second three way valve 402 from the plurality of three way valves 400. Both the first three way valve 401 and the second three way valve 402 are in fluid communication with a secondary heat exchanger 600. Moreover, the first condenser 205 is in fluid communication with a third three way valve 403 from the plurality of three way valves 400 and a fourth three way valve 404 from the plurality of three way valves 400. Both the third three way valve 403 and the fourth three way valve 404 are in fluid communication with a tertiary heat exchanger 601 through a tertiary pump 503. Two heat exchangers, namely the secondary heat exchanger 600 and the tertiary heat exchanger 601 are used since the second working fluid 201 in the S—$CO_2$ cycling unit 200 and a working fluid passing through the first condenser 205 may be different. The secondary heat exchanger 600 and the tertiary heat exchanger 601 are in fluid communication with the geothermal heat exchanger 113 through a fifth three way valve 405 and a sixth three way valve 406, wherein the fifth three way valve 405 and the sixth three way valve 406 are selected from the plurality of three way valves 400. The secondary pump 500 is used to control the flow from the sixth three way valve 406 to the geothermal heat exchanger 113.

Terminology used herein is for the purpose of describing particular embodiments only and is not intended to be limiting of the invention.

As used herein, the singular forms "a", "an" and "the" are intended to include the plural forms as well, unless the context clearly indicates otherwise. As used herein, the term "and/or" includes any and all combinations of one or more of the associated listed items and may be abbreviated as "/".

As used herein in the specification and claims, including as used in the examples and unless otherwise expressly specified, all numbers may be read as if prefaced by the word "substantially", "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), +/−15% of the stated value (or range of values), +/−20% of the stated value (or range of values), etc. Any numerical range recited herein is intended to include all subranges subsumed therein.

Disclosure of values and ranges of values for specific parameters (such as temperatures, molecular weights, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10 it also describes subranges for Parameter X including 1-9, 1-8, 1-7, 2-9, 2-8, 2-7, 3-9, 3-8, 3-7, 2-8, 3-7, 4-6, or 7-10, 8-10 or 9-10 as mere examples. A range encompasses its endpoints as well as values inside of an endpoint, for example, the range 0-5 includes 0, >0, 1, 2, 3, 4, <5 and 5.

The description and specific examples, while indicating embodiments of the technology, are intended for purposes of illustration only and are not intended to limit the scope of the technology. Moreover, recitation of multiple embodiments having stated features is not intended to exclude other embodiments having additional features, or other embodiments incorporating different combinations of the stated features. Specific examples are provided for illustrative purposes of how to make and use the compositions and methods of this technology and, unless explicitly stated otherwise, are not intended to be a representation that given embodiments of this technology have, or have not, been made or tested.

The citation of references herein does not constitute an admission that those references are prior art or have any relevance to the patentability of the technology disclosed herein. Any discussion of the content of references cited is intended merely to provide a general summary of assertions made by the authors of the references, and does not constitute an admission as to the accuracy of the content of such references.

Obviously, numerous modifications and variations of the present invention are possible in light of the above teachings. It is therefore to be understood that within the scope of the appended claims, the invention may be practiced otherwise than as specifically described herein.

The invention claimed is:

1. A heating and cooling system powered by renewable energy and assisted by geothermal energy, comprising:
    a solar cycling unit, wherein the solar cycling unit comprises a first working fluid, a solar collector, a thermal energy storage (TES), a heat exchanger, and a first pump, wherein the solar collector, the first pump, and the heat exchanger are in fluid communication through a first piping system carrying the first working fluid, wherein the TES is in fluid communication with the first pump to provide the first working fluid to the first pump;

a supercritical carbon dioxide ($S-CO_2$) cycling unit, wherein the $S-CO_2$ cycling unit comprises a second working fluid, a second pump, a first condenser, and a turbine, wherein the second pump and the first condenser are in fluid communication through a second piping system carrying the second working fluid, wherein the second pump is operatively coupled with the turbine;

a refrigerant cycling unit, wherein the refrigerant cycling unit comprises a third working fluid, a compressor, a second condenser, an evaporator, and at least one expansion valve, wherein the compressor, the second condenser, the at least one expansion valve, and the evaporator are in fluid communication through a third piping system carrying the third working fluid;

the solar cycling unit being in thermal communication with the $S-CO_2$ cycling unit through the heat exchanger, wherein heat absorbed by the first working fluid is transferred to the second working fluid at, the heat exchanger, wherein the second piping system passes through the heat exchanger and into the turbine; and the $S-CO_2$ cycling unit being operatively coupled with the refrigerant cycling unit to compress the third working fluid to produce a cooling effect;

a plurality of three way valves;
wherein the heat exchanger is in fluid communication with a first three way valve from the plurality of three way valves,
wherein the second pump is in fluid communication with a second three way valve from the plurality of three way valves,
wherein the first three way valve and the second three way valve are in fluid communication with a secondary heat exchanger,
wherein the first condenser is in fluid communication with a third three way valve from the plurality of three way valves and a fourth three way valve from the plurality of three way valves,
wherein the third three way valve and the fourth three way valve are in fluid communication with a tertiary heat exchanger through a tertiary pump,
the secondary heat exchanger and the tertiary heat exchanger being in fluid communication with a first geothermal heat exchanger through a fifth three way valve, a sixth three way valve, and a secondary pump wherein the fifth three way valve and the sixth three way valve are from the plurality of three way valves;
the refrigerant cycling unit further comprising a four way valve integrated into the third piping system;
wherein the second condenser is a second geothermal heat exchanger; and
the compressor, the four way valve, the evaporator, the at least one expansion valve, and the second geothermal heat exchanger being in fluid communication with each other through the third piping system carrying the third working fluid.

2. The heating and cooling system powered by renewable energy and assisted by geothermal energy of claim 1, wherein the first pump, the second pump, and the turbine are rotatably engaged to each other through a mutual shaft.

3. The heating and cooling system powered by renewable energy and assisted by geothermal energy of claim 1, further comprising an electric generator,
wherein the second pump is rotatably engaged to the turbine; and
the turbine being operatively coupled with the compressor and the electric generator.

4. The heating and cooling system powered by renewable energy and assisted by geothermal energy of claim 1, wherein the first working fluid is Therminol.

5. The heating and cooling system powered by renewable energy and assisted by geothermal energy of claim 1, wherein the first working fluid is molten salt.

6. The heating and cooling system powered by renewable energy and assisted by geothermal energy of claim 1, wherein the second working fluid is $S-CO_2$.

7. The heating and cooling system powered by renewable energy and assisted by geothermal energy of claim 1, wherein the third working fluid is Tetrafluroethane.

8. The heating and cooling system powered by renewable energy and assisted by geothermal energy of claim 1, wherein the third working fluid is $S-CO_2$.

9. The heating and cooling system powered by renewable energy and assisted by geothermal energy of claim 1, wherein the turbine is a single stage turbine.

10. The heating and cooling system powered by renewable energy and assisted by geothermal energy of claim 1, wherein the turbine is a multistage turbine.

11. The heating and cooling system powered by renewable energy and assisted by geothermal energy of claim 1, wherein the solar collector is a parabolic sola trough.

12. The heating and cooling system powered by renewable energy and assisted by geothermal energy of claim 1, wherein the solar collector is a solar tower.

13. The heating and cooling system powered by renewable energy and assisted by geothermal energy of claim 1, wherein the solar collector is a Fresnel collector.

* * * * *